(12) United States Patent
Torii

(10) Patent No.: US 7,665,122 B2
(45) Date of Patent: Feb. 16, 2010

(54) AUTHENTICATION APPARATUS, METHOD AND PROGRAM

(75) Inventor: Kan Torii, Yokoshima (JP)

(73) Assignee: Canon Kabushiki Kaisha, Tokyo (JP)

( * ) Notice: Subject to any disclaimer, the term of this patent is extended or adjusted under 35 U.S.C. 154(b) by 545 days.

(21) Appl. No.: 10/531,173

(22) PCT Filed: Jan. 27, 2004

(86) PCT No.: PCT/JP2004/000709

§ 371 (c)(1), (2), (4) Date: Apr. 11, 2005

(87) PCT Pub. No.: WO2004/068360

PCT Pub. Date: Aug. 12, 2004

(65) Prior Publication Data

US 2005/0262550 A1     Nov. 24, 2005

(30) Foreign Application Priority Data

Jan. 29, 2003    (JP) .............................. 2003-021039

(51) Int. Cl.
*H04L 9/00*       (2006.01)
*G06F 21/00*     (2006.01)

(52) U.S. Cl. .......................................... 726/2; 713/185
(58) Field of Classification Search ................. 726/1–5, 726/9; 713/182–185, 166
See application file for complete search history.

(56) References Cited

U.S. PATENT DOCUMENTS

| | | | |
|---|---|---|---|
| 6,021,496 A | | 2/2000 | Dutcher et al. |
| 6,078,586 A | * | 6/2000 | Dugan et al. ............. 370/395.2 |
| 7,216,361 B1 | * | 5/2007 | Roskind et al. ................. 726/9 |
| 7,251,732 B2 | * | 7/2007 | Jamieson et al. ............ 713/182 |
| 7,305,701 B2 | * | 12/2007 | Brezak et al. .................. 726/5 |
| 2002/0087894 A1 | | 7/2002 | Foley et al. |
| 2003/0028650 A1 | * | 2/2003 | Chen et al. ................... 709/229 |
| 2003/0055990 A1 | * | 3/2003 | Cheline et al. .............. 709/229 |

FOREIGN PATENT DOCUMENTS

| | | |
|---|---|---|
| EP | 0935221 | 11/2005 |
| JP | 11-219340 | 8/1999 |
| JP | 11-224236 | 8/1999 |
| JP | 2001-249941 | 9/2001 |
| JP | 2002-169898 | 6/2002 |
| JP | 2002-183093 | 6/2002 |
| JP | 2002-269043 | 9/2002 |
| WO | WO 02/25457 A1 | 3/2002 |

* cited by examiner

*Primary Examiner*—Nasser G Moazzami
*Assistant Examiner*—Eleni A Shiferaw
(74) *Attorney, Agent, or Firm*—Fitzpatrick, Cella, Harper & Scinto

(57) ABSTRACT

An authentication apparatus for solving problems involving convenience and security is disclosed. The authentication apparatus according to the present invention is an authentication apparatus having a plurality of authentication mechanisms, the apparatus determining (S23) whether authentication information that has been input by a card reader for inputting authentication information of an object of authentication is that of a user who is capable of changing over the plurality of authentication mechanisms, displaying (S24) a list of the plurality of authentication mechanisms if it is determined that the user is capable of making the changeover, and registering (S26) the authentication mechanism, which has been selected in the display list, as the effective authentication mechanism.

15 Claims, 17 Drawing Sheets

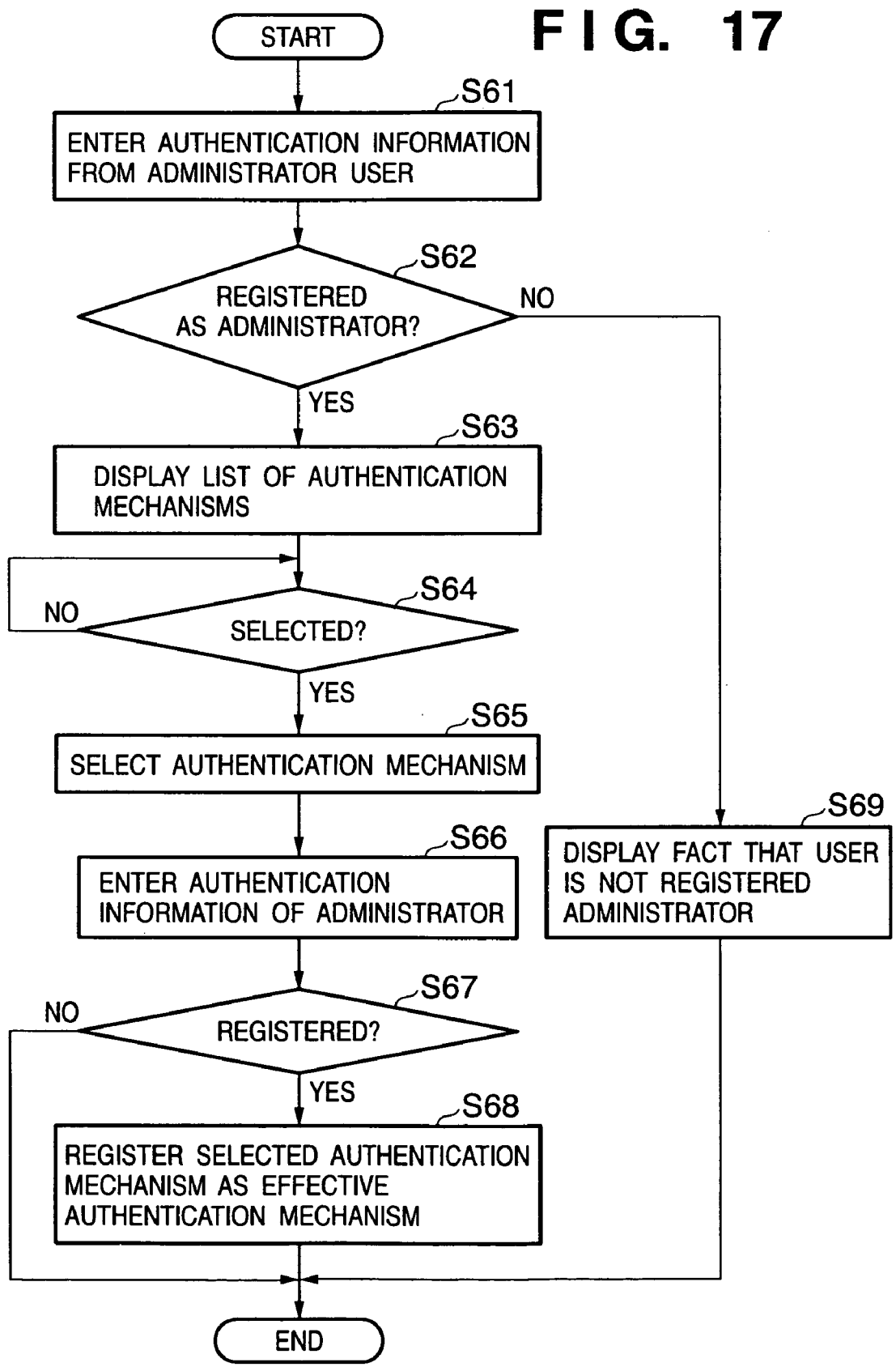

AUTHENTICATION APPARATUS, METHOD AND PROGRAM

TECHNICAL FIELD

This invention relates to a technique, which has a plurality of authentication mechanisms, for authenticating a user upon enabling one of these authentication mechanisms.

BACKGROUND ART

An apparatus of enhanced data security obtained by authenticating that a user is a prescribed user and so arranging it that the authenticated user can gain access is known in the art. Such an apparatus may have a plurality of authentication mechanisms for authenticating the user, not just a single authentication mechanism. These authentication mechanisms can be arranged hierarchically and, before a higher-order authentication mechanism is utilized, a lower-order authentication mechanism is employed to authenticate a user, or the plurality of authentication mechanisms can be arranged in parallel, any of the plurality of authentication mechanisms can be selected without authentication of the user, and user authentication is performed using the authentication mechanism that has been selected.

However, such prior art involves problems in terms of convenience and security. For example, with the hierarchical arrangement of the authentication mechanisms, it is necessary to provide user authentication information whenever the authentication mechanism of each layer is started up. This is a troublesome operation. With the parallel arrangement of the authentication mechanisms, the authentication mechanism is changed over without authentication of the user. Though this facilitates operation, a problem which arises is a commensurate decline in reliability in terms of security.

The present invention has been devised in view of these examples of the prior art and, in order to solve the problems involving convenience and security, is so adapted as to prompt the provision of authentication information when an authentication-mechanism changeover function is utilized.

Further, an object of the present invention is to verify authentication by a new authentication mechanism, before an authentication mechanism is changed over, in order to avoid a situation in which an apparatus can no longer be used because a user does not happen to have suitable authentication information after an authentication mechanism is changed over.

DISCLOSURE OF INVENTION

An authentication apparatus according to the present invention has the following structure in order to attain the foregoing object:

Specifically, the invention provides an authentication apparatus having a plurality of authentication mechanisms, characterized by comprising:

input means for inputting authentication information of a user;

determination means for determining whether the authentication information that has been input by the input means is that of a user who is capable of changing over the plurality of authentication mechanisms;

display control means for displaying a list of the plurality of authentication mechanisms if it has been determined by the determination means that the user is one capable of making the changeover; and registration means for registering, as an effective authentication mechanism, an authentication mechanism that has been selected from the list displayed by the display control means.

Further, an authentication method according to the present invention has the following steps in order to attain the foregoing object:

Specifically, the method is characterized by comprising:

an input step of inputting authentication information of a user;

a first authentication step of authenticating whether a user has access right to a first system using the authentication information of the user that has been input at the input step, and allowing the user to access the first system if authentication succeeds;

a second authentication step of authenticating whether the user has access right to a second system using the authentication information of the user that has been input at the input step, and allowing the user to access the second system if authentication succeeds;

a control step of controlling whether the user will be managed under management of the first system or under management of the second system; and a verification step of verifying that authentication of the user in the second system has succeeded in the second authentication step;

wherein if an instruction that shifts the user from management under the first system to management under the second system has been recognized, the control step controls the first authentication step and the second authentication step, in order to shift the user from management under the first system to management under the second system, on the condition that the authentication of the user at the second authentication step has been verified at the verification step.

Other features and advantages of the present invention will be apparent from the following descriptions taken in conjunction with the accompanying drawings, in which like reference characters designate the same or similar parts throughout the figures thereof.

BRIEF DESCRIPTION OF DRAWINGS

FIG. 17 is a flowchart useful in describing processing through which an administrator changes over an authentication mechanism using a user interface in the data processing apparatus according to the third embodiment.

BEST MODE FOR CARRYING OUT THE INVENTION

Preferred embodiments of the present invention will now be described in detail with reference to the accompanying drawings. It should be noted that the embodiments will be described for a case where a data processing apparatus is equipped with a plurality of authentication mechanisms, with provision of authentication information being performed by a card. However, the present invention is not limited to such an arrangement.

FIRST EMBODIMENT

Figure 1:
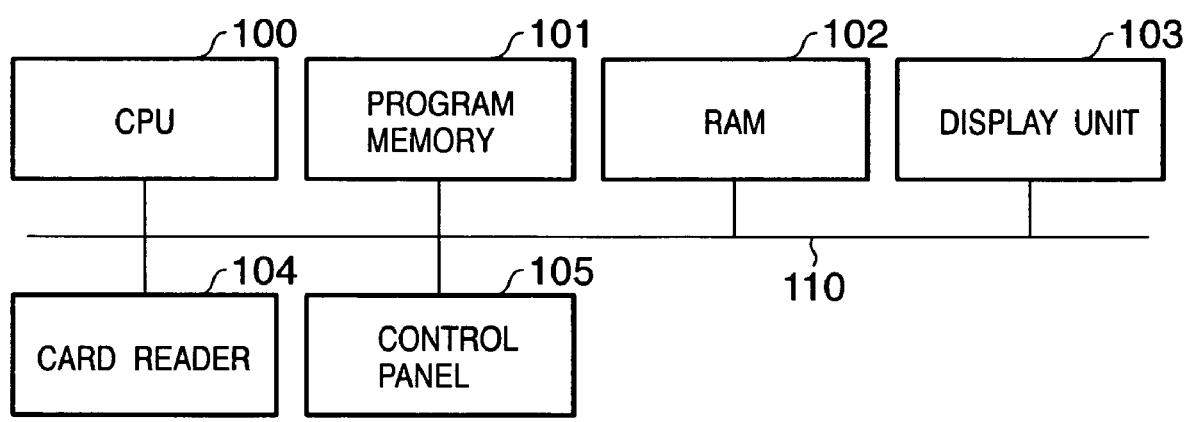
FIG. 1 is a block diagram for describing a hardware implementation of a data processing apparatus according to an embodiment of the present invention.

FIG. 1 a block diagram illustrating the structure of a data processing apparatus according to an embodiment of the present invention.

In the Figure, reference numeral 100 denotes a CPU (central processing unit) for executing processing, described later, in accordance with a program that implements a control method described in this embodiment. Reference numeral 101 denotes a program memory in which the control program executed by the CPU 100 has been stored. Numeral 102 denotes a RAM that furnishes a memory area (work area) for temporarily storing various data at execution of a control operation by the CPU 100. Numeral 103 denotes a display unit used to display messages and menus to the user as well as a list of authentication mechanisms in this embodiment. Numeral 104 denotes a card reader for reading a card presented by a user, whereby information that has been stored on the card is read. Numeral 105 denotes a control panel having an input unit such as a keyboard and pointing device and used to select authentication mechanisms, described later. Numeral 110 denotes a system bus connecting these components and the CPU 100 and including a data bus and a control signal bus, etc.

Besides the foregoing, the apparatus may be equipped with a large-capacity secondary storage device (a hard disk or MO) storing programs and image data, and a printer, etc., for printing out results of processing, etc.

Figure 2:
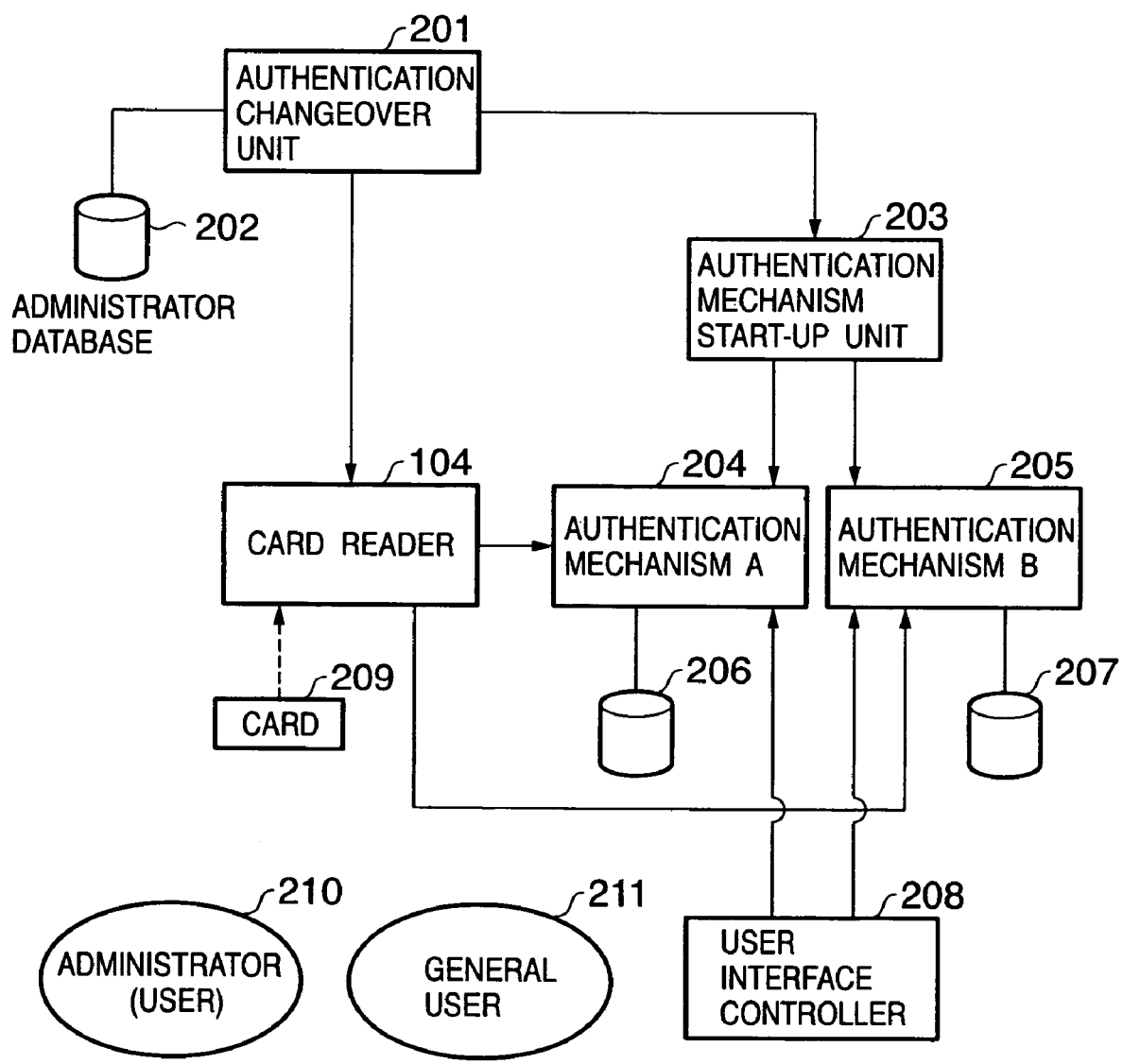
FIG. 2 is a functional block diagram for describing a functional implementation of the data processing apparatus according to a first embodiment.

FIG. 2 is a functional block diagram illustrating the functional implementation of the data processing apparatus according to the first embodiment. In the first embodiment, these various functions are implemented by having the CPU 100 execute a program.

In FIG. 2, reference numeral 201 denotes an authentication changeover unit for managing an administrator database 202, in which an administrator's name has been registered, and for storing a currently effective authentication mechanism. The administrator database 202 stores information such as administrator names. Reference numeral 203 denotes an authentication mechanism start-up unit that is capable of selecting and starting up an authentication mechanism that has been indicated by the authentication changeover unit 201. Reference numerals 204 and 205 denote two of a plurality of authentication mechanisms with which the apparatus has been equipped, these two mechanisms being represented by an authentication mechanism A that manages a first system and an authentication mechanism B that manages a second system, respectively. Reference numerals 206, 207 denote authentication mechanism databases storing information such as user names, these databases being for authentication mechanism A (204) and authentication mechanism B (205), respectively. Reference numeral 208 denotes a user interface controller for controlling inputs from the control panel 105 and displays on the display unit 103 to thereby present messages and alerts to the user. When a card 209 is inserted into the card reader 104 by a user, the card reader 104 is capable of reading information such as the user name that has been recorded on the card. The card information that has been read is sent from the card reader 104 to the authentication mechanism (204 or 205) that has been started up at this time. As a result, the authentication function searches the corresponding authentication mechanism database and determines whether the user of the card has been registered as the user of this authentication mechanism. If the user has been registered, then the user is authenticated. The card 209 is carried about by the user. Reference numeral 210 denotes an administrator and 211 a general user. Here a system includes separately provided independent systems. However, a case where authentication mechanisms exist in one system in association with a plurality of authentication levels is conceivable. For example, a system corresponding to a user level that is a first authentication level shall be referred to as a first system, and a system corresponding to a second authentication level, which corresponds to an administrator level that is the second authentication level, shall be referred to as a second system.

Figure 3:
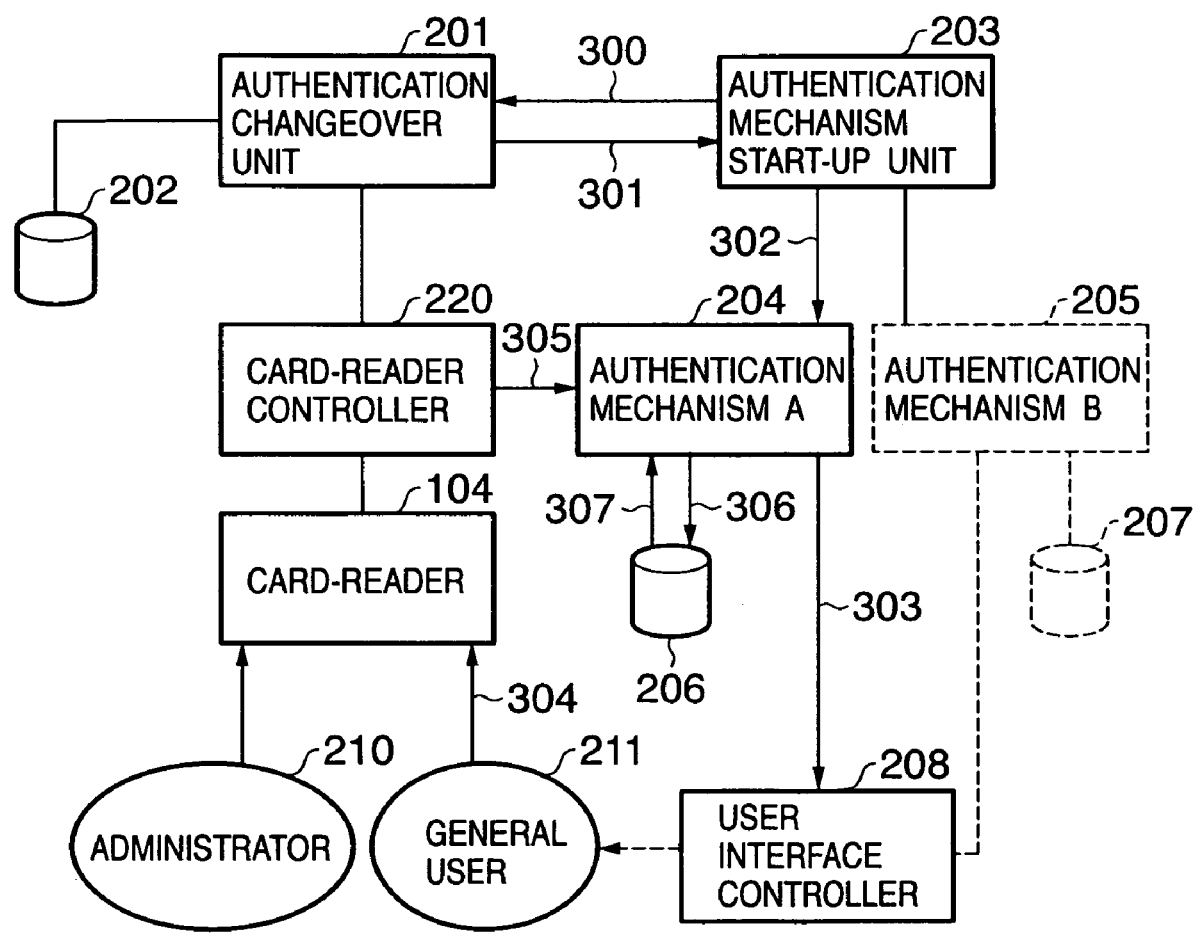
FIG. 3 is a functional block diagram for describing a case where authentication of a user is performed by a card in the data processing apparatus according to the first embodiment.

FIG. 3 is a diagram useful in describing exchanges between functional units in the data processing apparatus according to this embodiment.

When this data processing apparatus is started up, first control is handed over to the authentication mechanism start-up unit 203. The authentication mechanism start-up unit 203 queries the authentication changeover unit 20.1 with regard to the effective authentication mechanism (300). If the authentication mechanism A (204) or authentication mechanism B (205) is specified by an answer 301 to the query, then the authentication mechanism start-up unit 203 starts up the authentication mechanism specified (302). In FIG. 3, a case where the authentication mechanism A (204) is effective and will be started up is assumed. The authentication mechanism A (204) thus started up requests (303) the user interface controller 208 to display a card-insertion command screen so as to instruct the user to insert the card in the card reader 104. Upon receiving the request, the user interface controller 208 displays a screen, which prompts insertion of the card, on the display unit 103 in accordance with this request. It should be noted that the card whose insertion into the card reader 104 is requested is assumed to be a card, which is in the possession of the general user 211, for which changeover of the authentication mechanism is not allowed.

If the card of user 211 is thus inserted (304) into the card reader 104, a card-reader controller 220 delivers (305) the authentication information, which has been read from the card, to the authentication mechanism A (204). As a result, the authentication mechanism A (204) searches (306) the authentication mechanism database 206 of authentication mechanism A based upon this authentication information and checks to see whether the authentication information of the user has been registered in the database 206 of the authentication mechanism A (204). The result (307) of the search is obtained from the database 206. If the authentication information of the user 211 has been registered, then it is determined that the general user 211 has been authenticated.

It should be noted that the authentication mechanism A (204) is capable of executing authentication that utilizes challenge and response. However, the mode of authentication is not the gist of the present invention and is not described in detail here.

Figure 4:
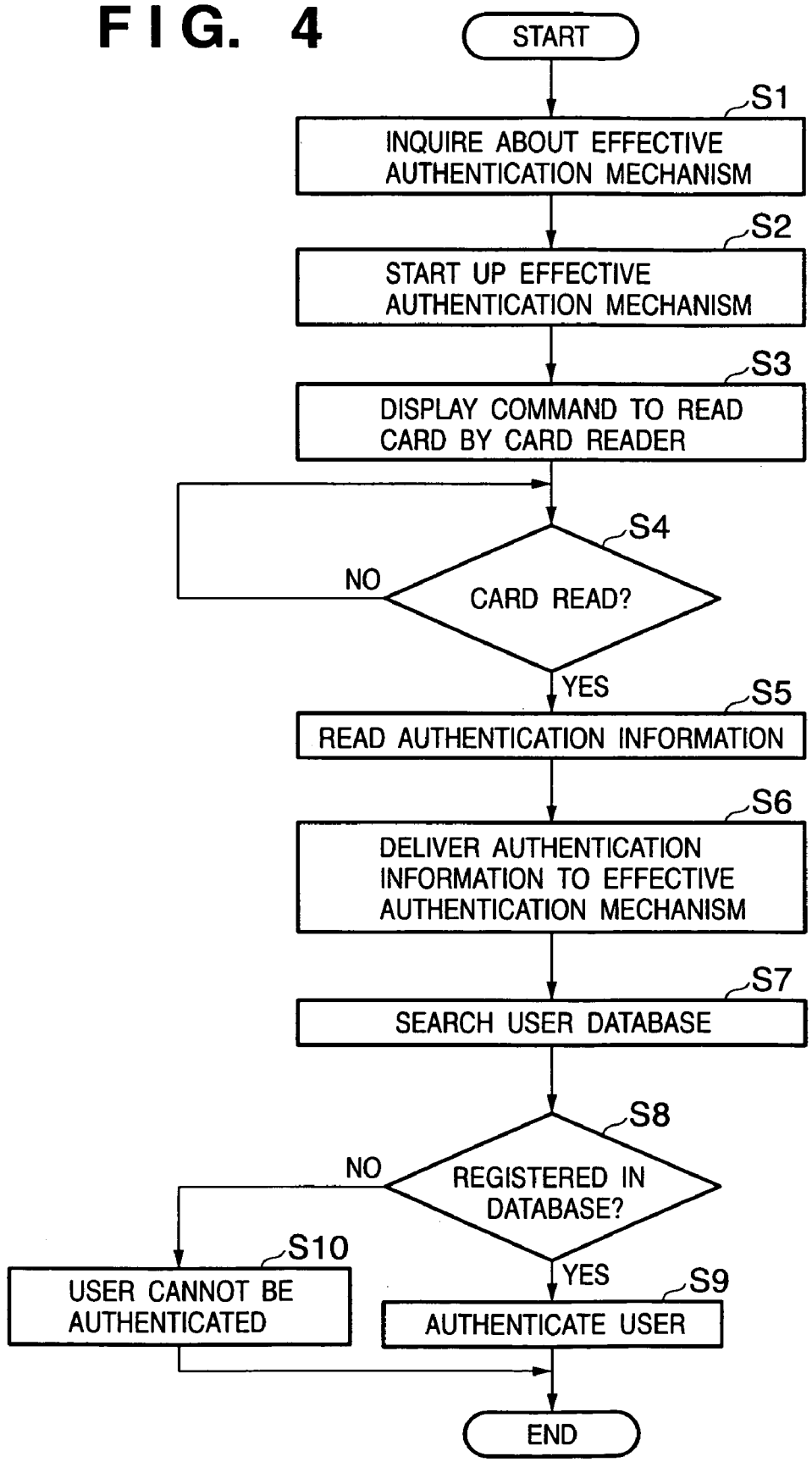
FIG. 4 is a flowchart for describing processing in a case where authentication of a user is performed by a card in the data processing apparatus according to the first embodiment.

FIG. 4 is a flowchart for describing the flow of processing in the functional block diagram illustrated in FIG. 3. The program for executing this processing has been stored in the program memory 101 and is executed under the control of the CPU 100.

When the data processing apparatus has been started up, first the authentication changeover unit 201 is queried concerning the effective authentication mechanism at step S1. Control then proceeds to step S2, where the authentication mechanism specified as being effective [here the authentication mechanism A (204)] is started up. Next, control proceeds to step S3, where the card-inserting command screen that instructs the user to insert the card into the card reader 104 is displayed on the display unit 103.

Next, control proceeds to step S4, where the apparatus waits for insertion of the user card into the card reader 104. If the card is inserted, control proceeds to step S5, at which the information on the inserted card is read. The read authentication information is delivered to the authentication mechanism A (204) at step S6. Control then proceeds to step S7, at which the authentication mechanism A (204) searches the database 206 of authentication mechanism A based upon the authentication information. It is determined at step S8 whether the authentication information of this user has been registered in the database 206 of authentication mechanism A (204). If the authentication information of user 211 has been registered in the database 206, it is judged that authentication has succeeded and control proceeds to step S9, where it is decided that the general user 211 has been authenticated. On the other hand, if it is found at step S8 that the authentication information of this user has not been registered in the database 206 of the authentication mechanism A (204), then it is judged that authentication has failed and control proceeds to step S10, at which it is decided that authentication of this user could not be achieved.

Here a case where the authentication mechanism A (204) has been selected has been described. However, it goes without saying that implementation is possible in similar fashion also in a case where authentication mechanism B (205) has been selected.

Figure 5:
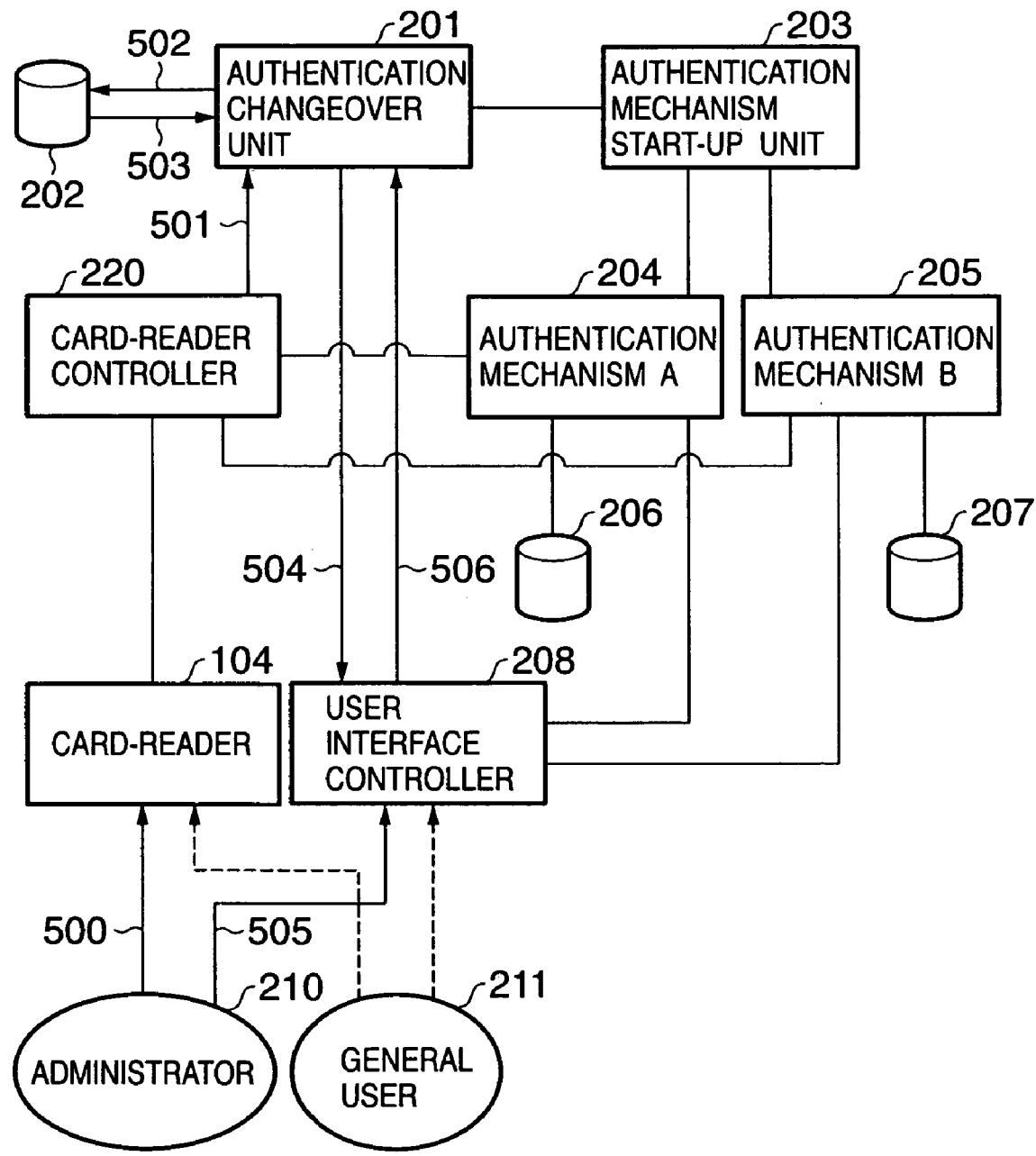
FIG. 5 is a functional block diagram for describing a case where an authentication mechanism is changed over by an administrator in the data processing apparatus according to the first embodiment.

Next, reference will be had to the functional block diagram of FIG. 5 to describe a case where changeover of the authentication mechanism has been specified by the user.

FIG. 5 is a diagram for describing a case where a card for which changeover of the authentication mechanism is allowed is inserted by the user (an administrator) after the authentication mechanism has been started up in the data processing apparatus according to this embodiment. A user who possesses such a card for which changeover of the authentication mechanism is allowed shall be referred to as the administrator 210. This illustrates a mode in which the user has already been authenticated at the user level with the first authentication mechanism and the authentication mechanism is changed over, through use of a card, to the second authentication mechanism that is for managing the authentication level of administrator privilege.

As another embodiment, the user may not need to have been authenticated by the first authentication mechanism. An mechanism for changing authentication mechanisms independent of the first authentication mechanism and second authentication mechanisms may be activated by the insertion of an administrator card. Then, an authentication mechanism selection screen is shown on display 103. By inputting a change over instruction via the operation panel 105, the administrator can change over authentication mechanisms from the first authentication mechanism to the second authentication mechanism.

If the administrator user 210 inserts the card into the card reader 104 (500), the card-reader controller 220 reads the information that has been recorded on the card. If it is determined that the card is one for which changeover of the authentication mechanism has been allowed, then the authentication information that has been recorded on the card is delivered to the authentication changeover unit 201. The authentication changeover unit 201 searches (502) the administrator database 202 based upon the authentication information delivered. If the information recorded on the card has been registered in the administrator database 202, this means that authentication will succeed. If the fact that authentication has succeeded is determined based upon the result of the search (503), then the authentication changeover unit 202 requests (504) the user interface controller 208 to display a screen prompting the selection of the authentication mechanism. Upon being delivered this request, the user interface controller 208 displays on the display unit 103 a list of authentication mechanisms with which the data processing apparatus is equipped. If on the basis of the displayed list the administrator user 210 selects a desired authentication mechanism (505), then the name of the selected authentication mechanism is sent from the user interface controller 208 to the authentication changeover unit 201 and is stored as the effective authentication mechanism. The information thus stored is referred to by the authentication mechanism start-up unit 203 the next time the data processing apparatus is started up, and the authentication mechanism is started up based upon this information.

Figure 6:
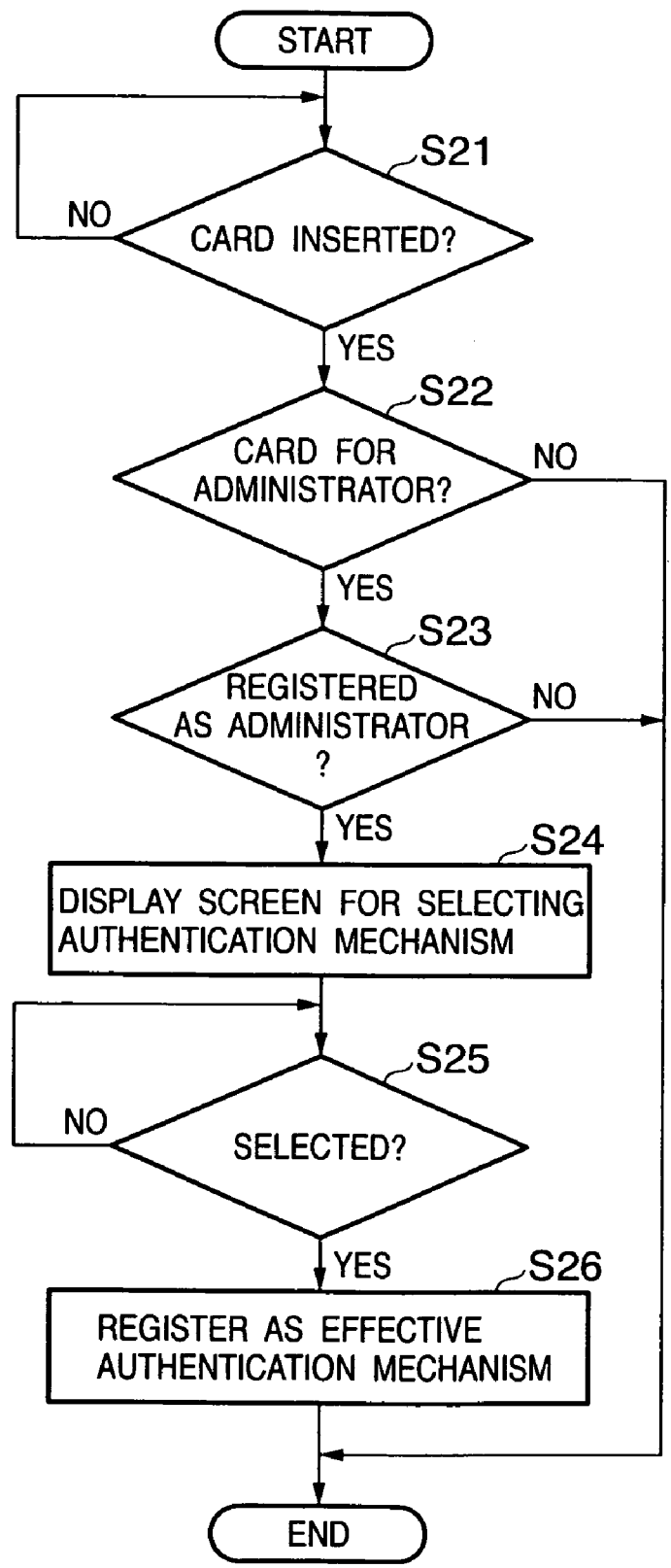
FIG. 6 is a flowchart for describing processing in a case where an authentication mechanism is changed over by an administrator in the data processing apparatus according to the first embodiment.

FIG. 6 is a flowchart for describing the flow of processing in the functional block diagram illustrated in FIG. 5. The program for executing this processing has been stored in the program memory 101 and is executed under the control of the CPU 100.

First, whether a card has been inserted into the card reader 104 is checked at step S21. If the card has been inserted into the card reader 104, control proceeds to step S22, at which it is determined whether the administrator user 210 has inserted the card for the administrator into the card reader 104, i.e., whether a card for which changeover of authentication mechanism is allowed has been inserted. If the card has been inserted, then control proceeds to step S23, where authentication information that has been recorded on the card is delivered to the authentication changeover unit 201 and it is determined whether the administrator is one who has been recorded in the administrator database 202. In a case where the information that has been recorded on the card has been registered in the administrator database 202, control proceeds to step S24 on the grounds that authentication has succeeded. Here a list of authentication mechanisms that prompts selection of the authentication mechanism is displayed on the display unit 103. Next, control proceeds to step S25. If the administrator user 210 selects a desired authentication mechanism using the control panel 105 on the basis of the displayed list, the name of the selected authentication mechanism is stored as the effective authentication mechanism. The information thus selected is referred to by the authentication mechanism start-up unit 203 the next time the data processing apparatus is started up, and this authentication mechanism is started up. In the meantime, the user continues to be in the authenticated state in the first authentication mechanism of the user level. Accordingly, in response to success of authentication and storing of the name of the second authentication mechanism as the effective authentication mechanism, the user for whom authentication succeeded is freed from management under the first authentication mechanism. This is an ideal situation. The reason for this is as follows: If a user were to be immediately freed from management from the first authentication mechanism in response to a changeover instruction, then, in the event that there were no other users available in case of authentication failure in the second authentication mechanism, the authentication mechanism or overall system would not be restartable or system recovery would not be possible, as set forth earlier.

If the program judges at step S22 that the card for the administrator has not been inserted, or if it is found at step S23 that the person possessing the card has not been registered as an administrator, this means that the card that has been inserted by the administrator user 210 is not a card for which a changeover of authentication mechanism is allowed and, hence, processing is exited as is with no further processing. In the meantime, the user continues to be in the authenticated state in the user-level authentication mechanism and therefore the system which the user-level authentication mechanism manages can be restored. In certain cases, a display to the effect that "AUTHENTICATION CHANGEOVER HAS FAILED" may be presented on the control panel 105 by the system operating under the authentication mechanism prevailing prior to the changeover. Here the system under the management of the first authentication mechanism shall be referred to as the first system and the system under the management of the second authentication mechanism after the changeover shall be referred to as the second system.

As another embodiment, the user may not need to have been authenticated by the first authentication mechanism. An mechanism for changing authentication mechanisms independent of the first authentication mechanism and second authentication mechanisms may be activated by the insertion of an administrator card. Then, an authentication mechanism selection screen is shown on display 103. By inputting a change over instruction via the operation panel 105, the administrator can change over authentication mechanisms from the first authentication mechanism to the second authentication mechanism. Thus, there have been described the card reader 104 and control panel serving as ideal examples of input means for inputting user authentication information such as a set consisting of a user name stored on a card and a password or an electronic certificate of proof; a first authentication mechanism for authenticating whether a user has access right to a first system, which prevails prior to an authentication changeover, using the user authentication information entered into the card reader; a second authentication mechanism for authenticating whether the user has access right to a second system, which prevails after an authentication changeover, using the user authentication information entered into the card reader, and allowing the user to access the second system if authentication has succeeded; a control program, which has been stored in the program memory 101, for controlling whether the user is managed under the management of the first system or under the management of the second system; and a verification program for verifying that authentication of the user in the second system has succeeded in the second authentication mechanism. Further, in a case where an instruction that shifts the user from management under the first system to management under the second system has been recognized, the control program controls the first authentication mechanism and the second authentication mechanism, in order to shift the user from management under the first system to management under the second system, on the condition that the authentication of the user by the second authentication mechanism has been verified by the verification program.

In accordance with the first embodiment, as described above, there is provided an apparatus equipped with a plurality of authentication mechanisms, in which an authentication mechanism that has been registered as being effective can be started up and a user is capable of being authenticated by the authentication mechanism that has been started up. Further, a desired authentication mechanism can be selected from among the plurality of authentication mechanisms and can be used to authenticate the user.

SECOND EMBODIMENT

In a second embodiment, a case where authentication of a user is performed by both a web page and the control panel 105 in a data processing apparatus equipped with a plurality of authentication mechanisms will be described.

Figure 7:
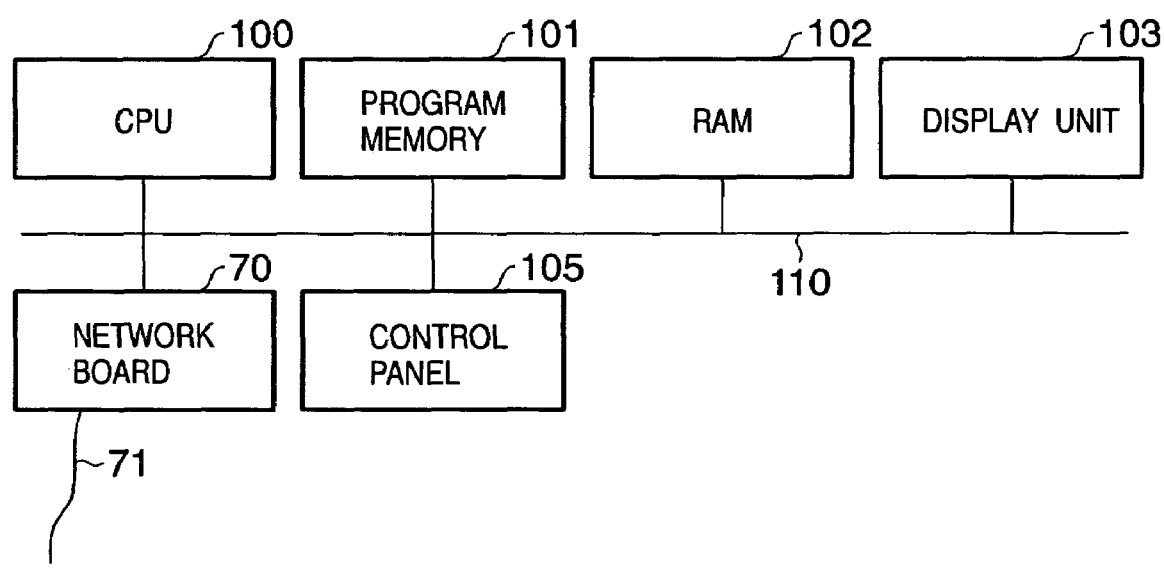
FIG. 7 is a block diagram for describing a hardware implementation of a data processing apparatus according to a second embodiment of the present invention.

FIG. 7 is a block diagram illustrating the hardware implementation of a data processing apparatus according to a second embodiment of the present invention. Components similar to those of the first embodiment are designated by like symbols and a description thereof is omitted.

The data processing apparatus according to the second embodiment is provided with a network board 70 for performing communication via a communication line 71.

Figure 8:
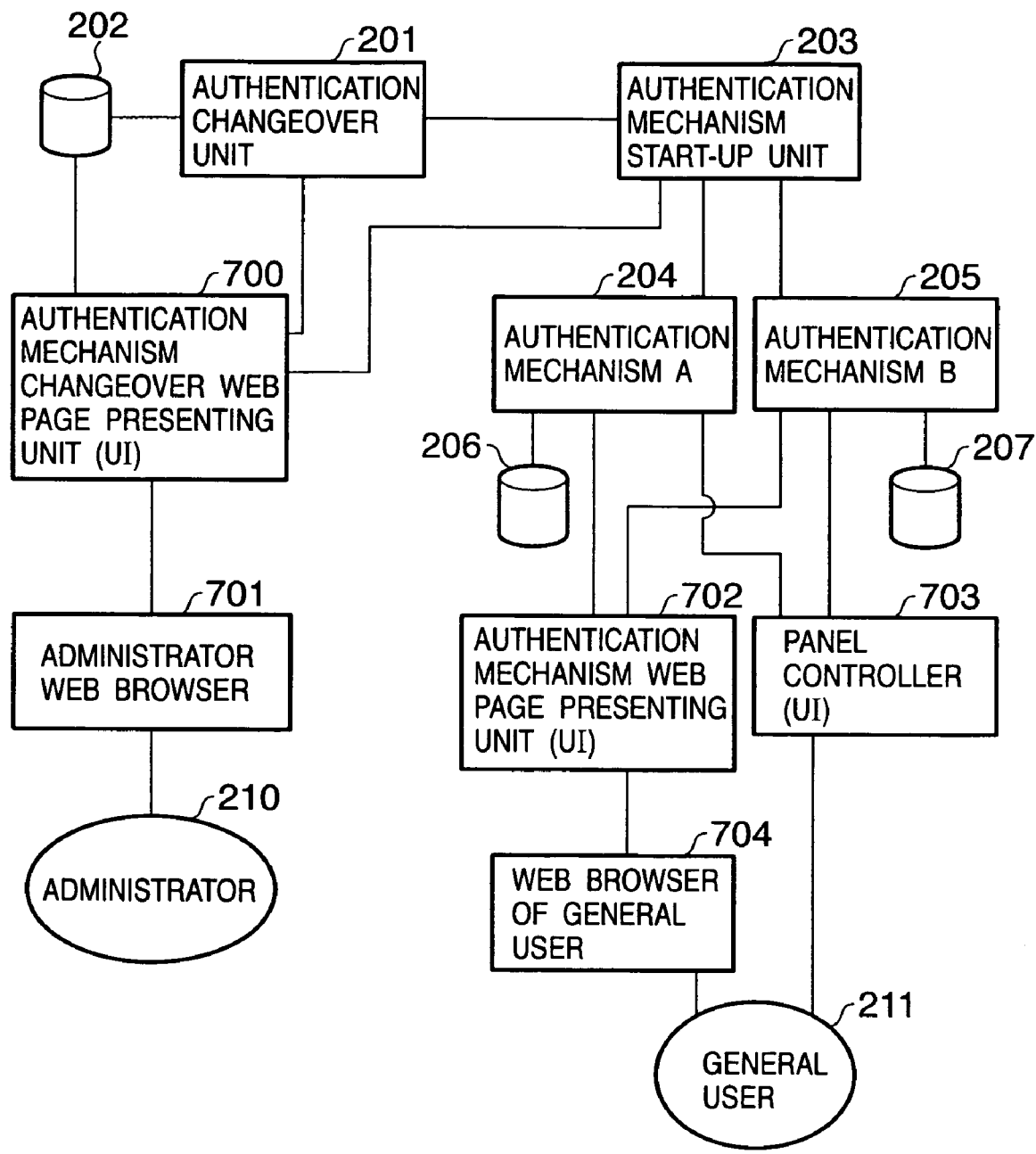
FIG. 8 is a functional block diagram for describing a functional implementation of the data processing apparatus according to the second embodiment.

FIG. 8 is a functional block diagram illustrating the functional implementation of the data processing apparatus according to the second embodiment. Components similar to those of the first embodiment are designated by like symbols. Furthermore, as in the first embodiment, these various functions are implemented by having the CPU 100 execute a program in the second embodiment as well.

Reference numeral 202 denotes the administrator database in which information such as the name of the administrator has been stored. The authentication changeover unit 201 stores the currently effective authentication mechanism and is capable of changing over to this effective authentication mechanism. The authentication mechanism start-up unit 203 has a mechanism for deciding the authentication mechanism to be started up. Reference numerals 204 and 205 denote two of a plurality of authentication mechanisms with which the apparatus has been equipped, these two mechanisms being represented by authentication mechanism A and authentication mechanism B, respectively. Reference numerals 206, 207 denote authentication mechanism databases storing information such as user names, these databases being for authentication mechanism A (204) and authentication mechanism B (205), respectively. Reference numeral 703 denotes a liquid crystal panel controller for controlling the control panel 105 and the display unit 103. Reference numeral 700 denotes an authentication mechanism changeover web page presenting unit that constructs a web page, which is for changing over the authentication mechanism, and provides an administrator web browser 701, which is operated by the administrator 210, with display data via a network. The authentication mechanism changeover web page presenting unit 700 also provides a web page for authenticating the administrator 210. Reference numeral 702 denotes an authentication mechanism web page presenting unit shared by a plurality of authentication mechanisms. This unit provides a web page for authenticating a user to a browser 704, which is operated by the user 211, via the network. The administrator web browser 701 and the web browser 704 of the general user are web browsers that operate on the computers manipulated by the users; it goes without saying that they are not included in this data processing apparatus.

Figure 9:
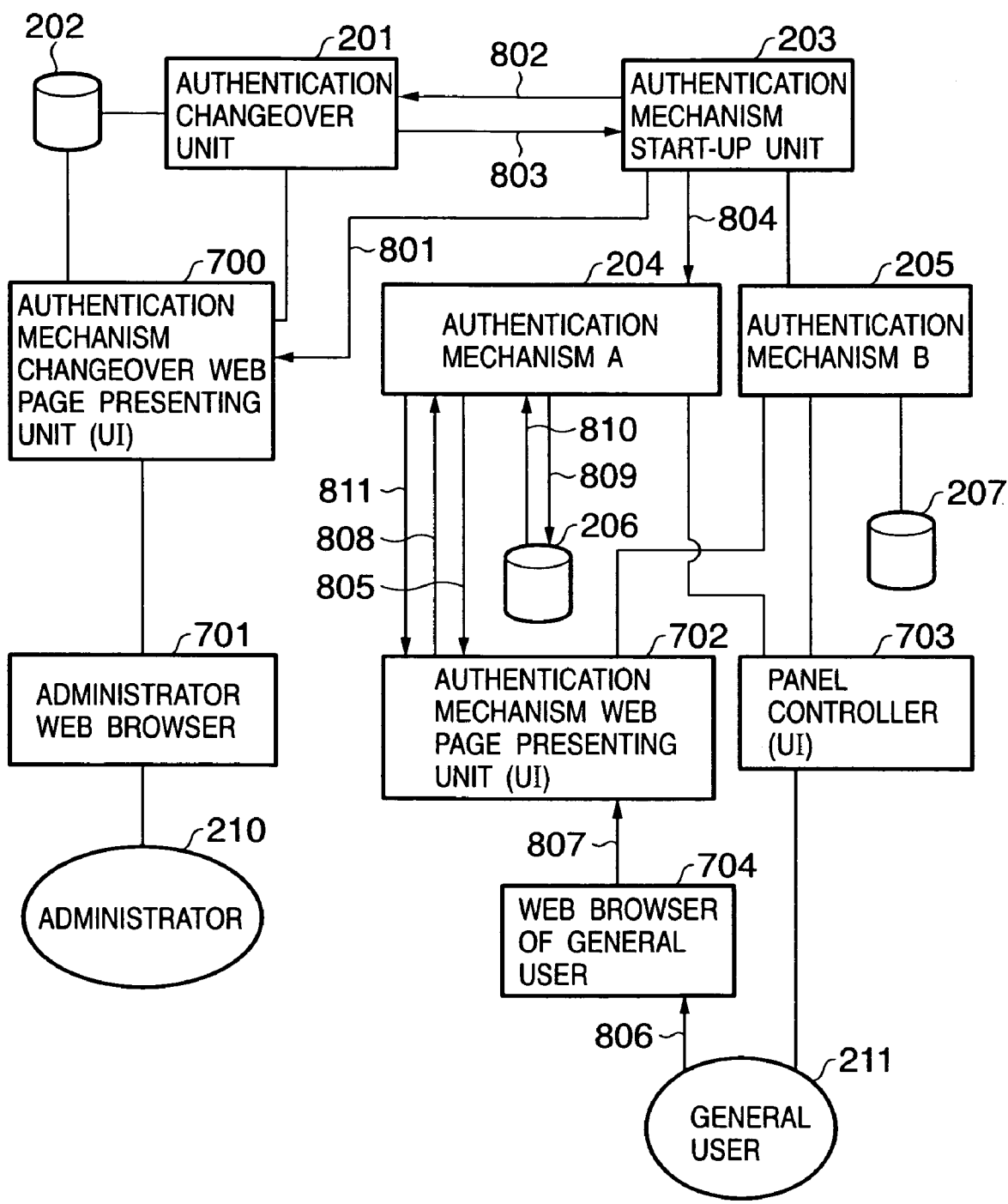
FIG. 9 is a functional block diagram for describing a case where user authentication is performed using a web browser of the user in the data processing apparatus according to the second embodiment.

FIG. 9 is a diagram useful in describing exchanges between the software components (FIG. 8) when the data processing apparatus according to the second embodiment is started up.

First, when the data processing apparatus is started up, control is handed over to the authentication mechanism start-up unit 203. The authentication mechanism start-up unit 203 starts up the authentication mechanism changeover web page presenting unit 700 unconditionally (801). The authentication mechanism start-up unit 203 queries the authentication changeover unit 201 with regard to the effective authentication mechanism (802). The authentication mechanism A (204) or the authentication mechanism B (205) is started up depending upon the result (803). In FIG. 8, the authentication mechanism A (204) is effective and therefore a case where the authentication mechanism A (204) is started up is illustrated. The authentication mechanism A (204) thus started up requests (805) the authentication mechanism web page presenting unit 702 to display an authentication screen. Upon receiving the request, the authentication mechanism web page presenting unit 702 displays a screen, which prompts input of authentication information such as the user name, on the display unit 103. If in response authentication information is entered (806, 807) by the user via the web browser 704 of the general user, the authentication mechanism web page presenting unit 702 delivers the entered authentication information (808) to the authentication mechanism A (204). As a result, the authentication mechanism A (204) searches (809) the authentication mechanism database 206 of authentication mechanism A based upon this entered authentication information. In accordance with the result (810) of the search, it is determined whether the user 211 is to be authenticated and this is reported (811) to the authentication mechanism web page presenting unit 702. It should be noted that the authentication mechanism A (204) and authentication mechanism web page presenting unit 702 are capable of executing authentication that utilizes challenge and response. However, the mode of authentication is not the gist of the present invention and is not described in detail here.

Figure 10:
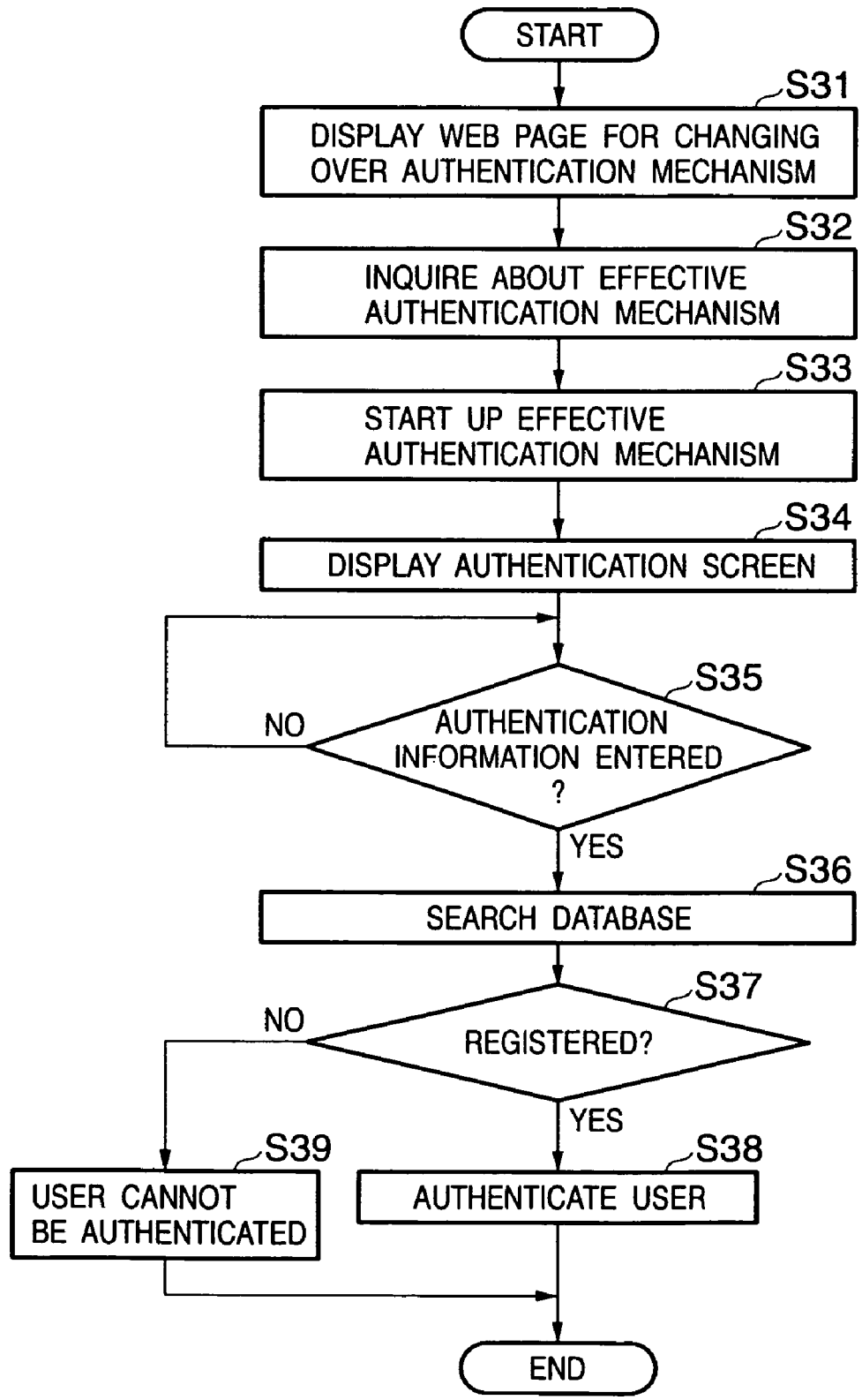
FIG. 10 is a flowchart useful in describing processing for performing user authentication using a web browser of the user in the data processing apparatus according to the second embodiment.

FIG. 10 is a flowchart for describing the flow of processing in the functional block diagram illustrated in FIG. 9. The program for executing this processing has been stored in the program memory 101 of FIG. 7 and is executed under the control of the CPU 100.

This processing is started by starting up the data processing apparatus. At step S31, the authentication mechanism changeover web page presenting unit 700 is started up unconditionally and a web page for changing over the authentication mechanism is displayed. Next, control proceeds to step S32, at which the authentication changeover unit 201 is queried concerning the effective authentication mechanism. The authentication mechanism A (204) or authentication mechanism B (205) is started up at step S33. The authentication mechanism thus started up displays a screen, which is for prompting entry of authentication information such as user name, on the display unit 103. Next, control proceeds to step S35, where the apparatus waits for the user to enter authentication information via the web browser 704 of the general user. If the authentication information is entered, then the entered authentication information is delivered to the effective authentication mechanism. As a result, this authentication mechanism searches the database of this authentication mechanism based upon the entered authentication information (step S36). If the result of the search is that the user name, etc., has been registered in this authentication mechanism database, control proceeds to step S38 and it is decided that this user has been authenticated. On the other hand, if it is found at step S37 that the user name has not been registered, then control proceeds to step S39, where it is decided that the user is not authenticated. This result is reported to and displayed on the authentication mechanism web page presenting unit 702.

Figure 11:
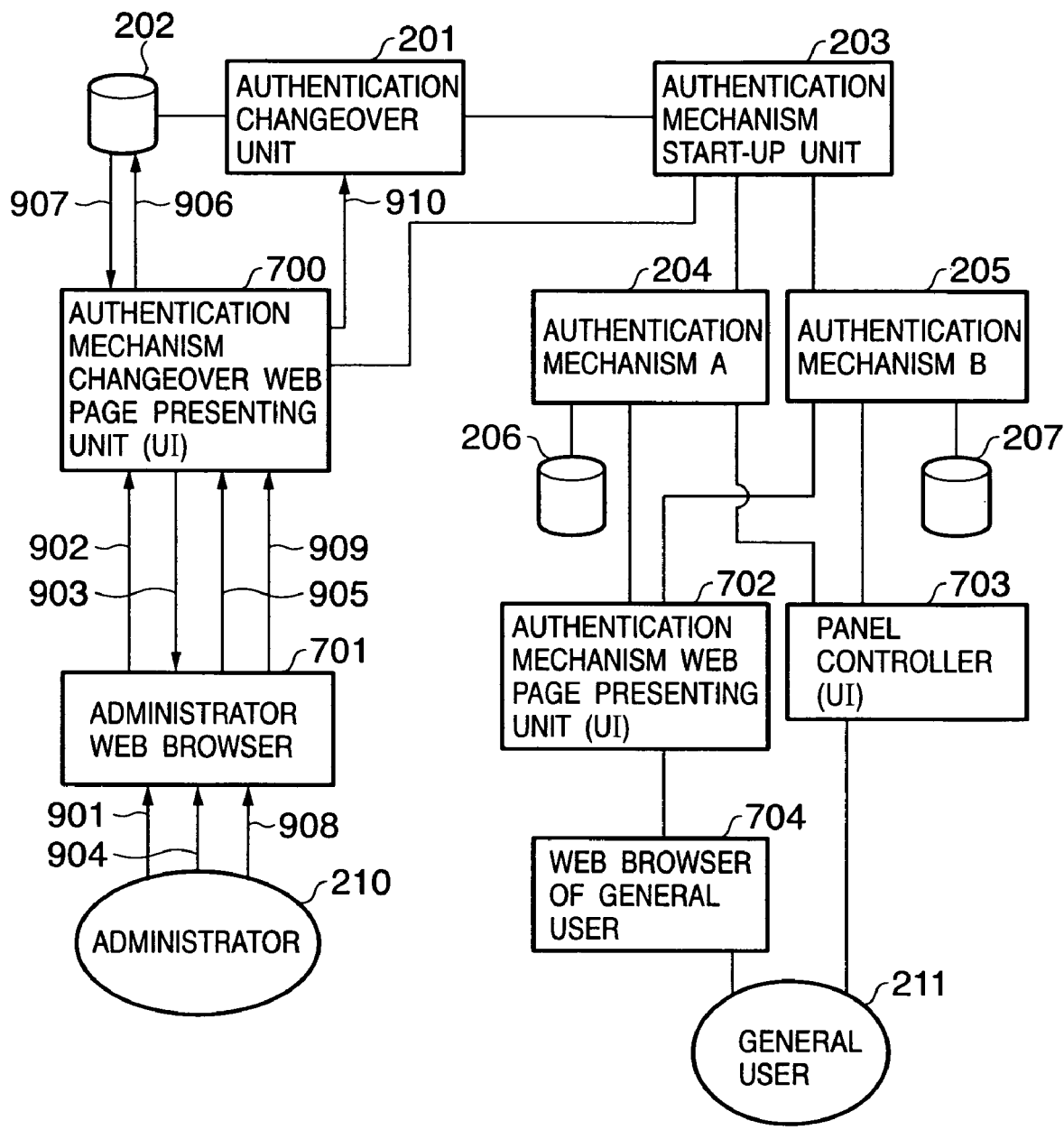
FIG. 11 is a functional block diagram for describing a case where an authentication mechanism is changed over using a web browser of an administrator in the data processing apparatus according to the second embodiment.

FIG. 11 is a diagram for describing a case where the administrator user changes over the authentication mechanism after the data processing apparatus of the second embodiment has been started up. The user having this privilege shall be referred to as the administrator.

First, the administrator user 210 accesses (902) the authentication mechanism changeover web page presenting unit 700 using the administrator web browser 701 (901). As a result, an authentication screen is displayed on the administrator web browser 701. Accordingly, the administrator user 210 enters authentication information such as a name (904, 905). The authentication information thus entered is delivered (910) from the authentication mechanism changeover web page presenting unit 700 to the authentication changeover unit 201. On the basis of the authentication information delivered, the authentication mechanism changeover web page presenting unit 700 searches (906) the administrator database 202. If the entered authentication information has been registered in the administrator database 202 according to the response (907), then authentication of the administrator will succeed. If authentication thus succeeds, a web page bearing a list of the authentication mechanisms with which this data processing apparatus is equipped is presented (903) on the administrator web browser 701. If in response the administrator user 210 refers to this list and selects (908) a desired authentication mechanism, then the name of the authentication mechanism that has been selected is delivered to the authentication mechanism changeover web page presenting unit 700 and authentication changeover unit 201 (909, 910) and is stored as the effective authentication mechanism. The information thus stored is referred to by the authentication mechanism start-up unit 203 the next time the data processing apparatus is started up, and the authentication mechanism stored as the effective mechanism is started up.

Figure 12:
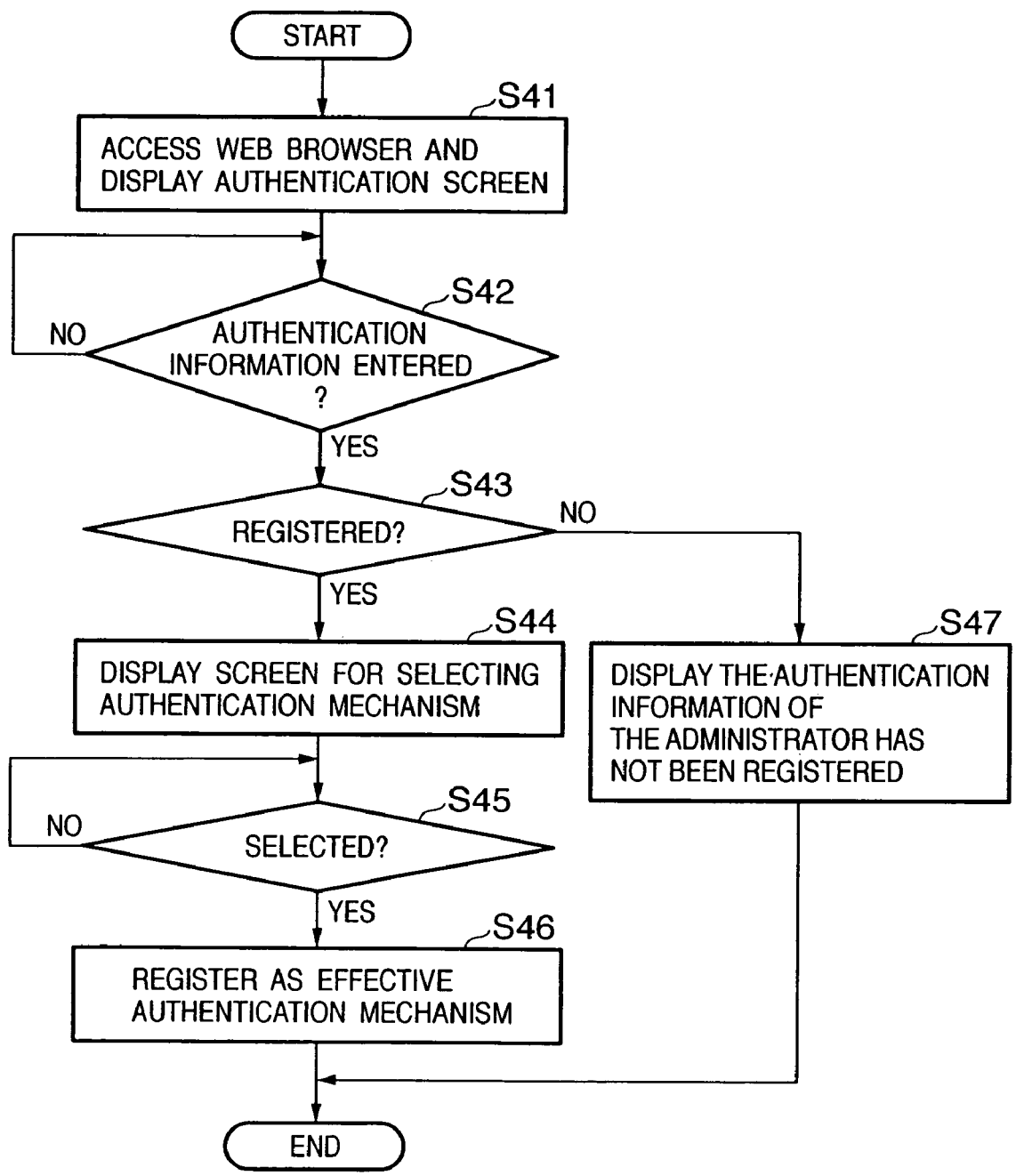
FIG. 12 is a flowchart useful in describing processing for performing changeover of an authentication mechanism using a web browser of an administrator in the data processing apparatus according to the second embodiment.

FIG. 12 is a flowchart for describing the flow of processing according to the second embodiment in the diagram illustrated in FIG. 11. The program for executing this processing has been stored in the program memory 101 and is executed under the control of the CPU 100.

First, at step S41, the administrator user 210 accesses the authentication mechanism changeover web page presenting unit 700 using the administrator web browser 701 and displays an authentication screen on the administrator web browser 701. Next, if authentication information such as a name is entered by the administrator user 210 at step S42, control proceeds to step S43, where a search is conducted by the authentication mechanism changeover web page presenting unit 700 to determine whether the entered authentication information has been registered in the administrator database 202. If the authentication information has been registered, control proceeds to step S44, where a web page bearing a list of authentication mechanisms with which this data processing apparatus is equipped is presented on the administrator web browser 701. As a result, this list is displayed on the display unit 103. Control then proceeds to step S45. If the administrator 210 refers to this list and selects a desired authentication mechanism, control proceeds to step S46, at which the name of the selected authentication mechanism is delivered to the authentication mechanism changeover web page presenting unit 700 and host computer 200 (909, 910) and registered as the effective authentication mechanism. The information thus stored is referred to by the authentication mechanism start-up unit 203 the next time the data processing apparatus is started up, and the authentication mechanism stored as the effective mechanism is started up.

On the other hand, when it is found at step S43 that the entered authentication information has not been registered as the administrator, control proceeds to step S47, where a display to the effect that the authentication information of this administrator has not been registered is presented on the display unit 103. It should be noted that the processing of step S47 may just as well be executed in a case where a "NO" decision is rendered at step S22 or step S23 in FIG. 6.

Thus, in accordance with the second embodiment, as described above, there is provided an apparatus equipped with a plurality of authentication mechanisms, in which an authentication mechanism that has been registered as being effective can be started up, the web page of the authentication mechanism that has been started up can be accessed by the web browser of a user and the user can be authenticated.

Further, a web page for changing over authentication can be accessed by a web browser, a desired authentication mechanism can be selected from among a plurality of authentication mechanisms and this authentication mechanism can be used to authenticate a user.

THIRD EMBODIMENT

A data processing apparatus according to a third embodiment of the present invention will be described next.

Figure 13:
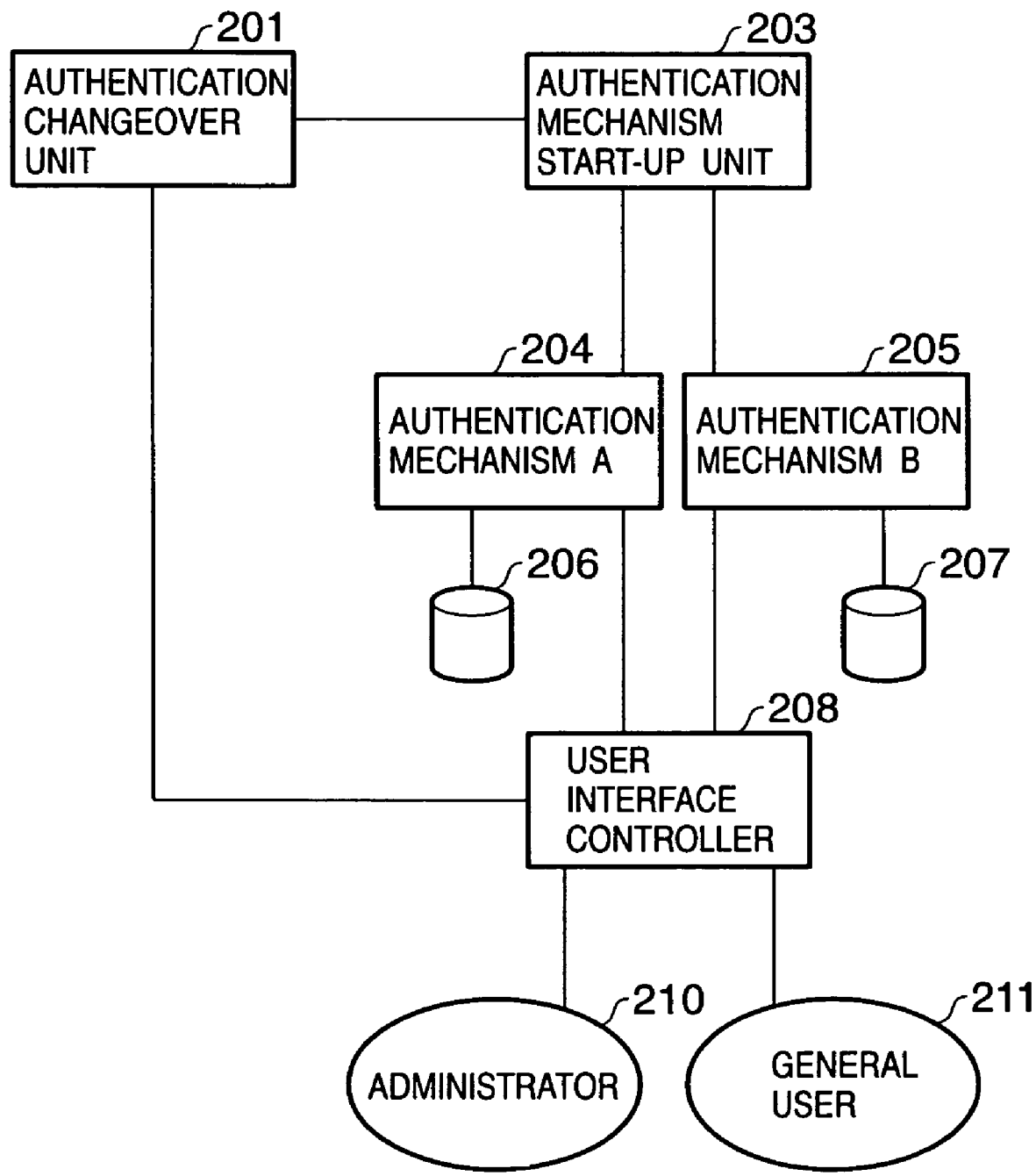
FIG. 13 is a functional block diagram for describing a functional implementation of a data processing apparatus according to a third embodiment of the present invention.

FIG. 13 is a functional block diagram illustrating the functional implementation of the data processing apparatus according to the third embodiment. Components similar to those of the above-described embodiments are designated by like symbols or numerals. Furthermore, the hardware implementation of the data processing apparatus according to the third embodiment is similar to that of the first embodiment and therefore a description thereof is omitted. The third embodiment is characterized in that authentication of a user is performed by an input from the control panel 105 controlled by the user interface controller 208.

The authentication changeover unit 201 stores the currently effective authentication mechanism. The authentication mechanism start-up unit 203 starts up the effective authentication mechanism based upon information indicative of the effective authentication mechanism from the authentication changeover unit 201. Reference numerals 204 and 205 denote two of a plurality of authentication mechanisms with which the data processing apparatus has been equipped, these two mechanisms being represented by authentication mechanism A and authentication mechanism B, respectively. Reference numerals 206, 207 denote authentication mechanism databases storing information such as user names on a per-authentication mechanism basis, these databases being for authentication mechanism A (204) and authentication mechanism B (205), respectively. Reference numeral 208 denotes a user interface controller, which is shared by a plurality of authentication mechanisms, for controlling the control panel 105 and display unit 103 of the data processing apparatus.

Figure 14:
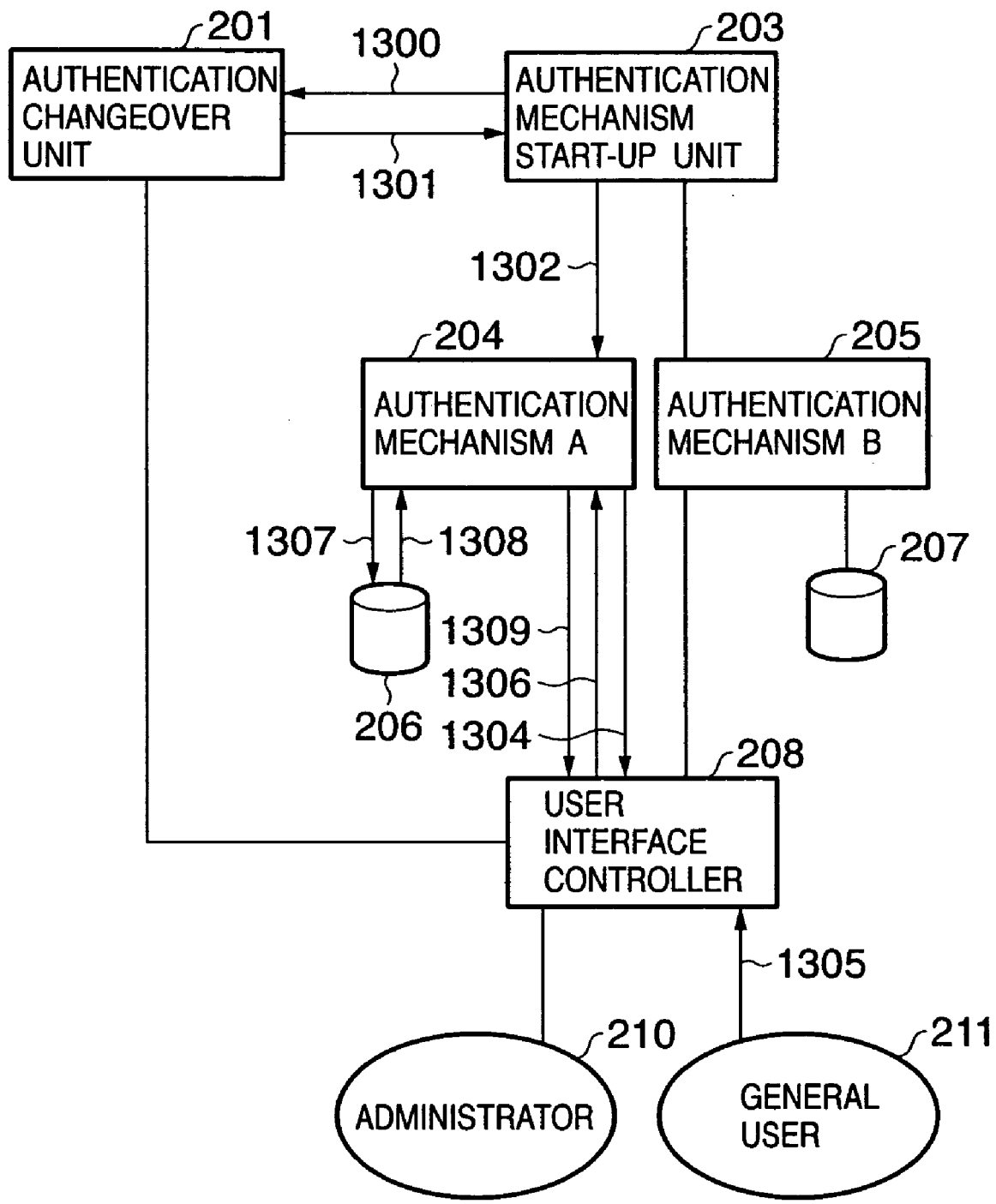
FIG. 14 is a functional block diagram for describing a case where user authentication is performed using a user interface in the data processing apparatus according to the third embodiment.

FIG. 14 is a diagram useful in describing exchanges between the software components (FIG. 13) in the data processing apparatus according to the third embodiment.

First, when the data processing apparatus is started up, control is handed over to the authentication mechanism start-up unit 203, whereupon the authentication mechanism start-up unit 203 queries the authentication changeover unit 201 with regard to the effective authentication mechanism (1300). The authentication mechanism A (204) or the authentication mechanism B (205) is started up depending upon the result (1301). In FIG. 14, a case where the authentication mechanism A (204) is started up as the effective authentication mechanism is illustrated. The authentication mechanism A (204) thus started up requests (1304) the user interface controller 208 to display an authentication screen. Upon receiving the request, the user interface controller 208 displays a screen, which prompts input of authentication information such as the user name, on the display unit 103. If authentication information is entered (1305) by the user 211 using the control panel 105 on the basis of this display, the user interface controller 208 delivers the authentication information (1306), which has been entered from the control panel 105, to the authentication mechanism A (204). As a result, the authentication mechanism A (204) searches (1307) the authentication mechanism database 206 of authentication mechanism A based upon this entered authentication information to determine whether the authentication information of user 211 has been registered. In accordance with the result (1308) of the search, it is determined whether the user 211 is to be authenticated and this is reported (1309) to the user interface controller 208.

Figure 15:
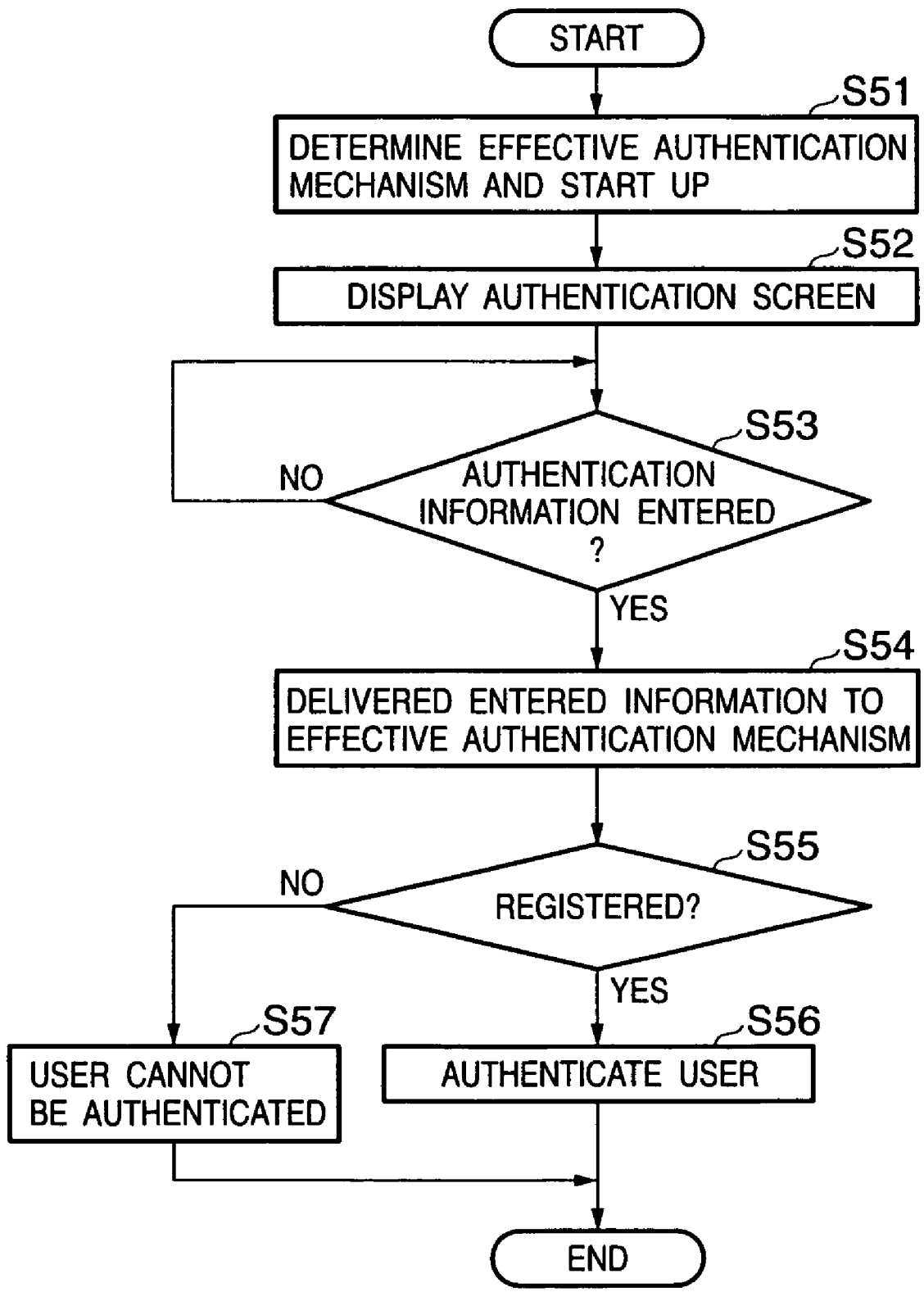
FIG. 15 is a flowchart useful in describing processing for performing user authentication using a user interface in the data processing apparatus according to the third embodiment.

FIG. 15 is a flowchart for describing the flow of processing in the diagram according to the third embodiment illustrated in FIG. 14. The program for executing this processing has been stored in the program memory 101 of FIG. 7 and is executed under the control of the CPU 100.

This processing is started by starting up the data processing apparatus. First, at step S51, the effective authentication mechanism is determined and authentication mechanism A (204) or authentication mechanism B (205) is started up as the effective mechanism. When the authentication mechanism is thus started up, control proceeds to step S52, where an authentication screen is displayed on the display unit 103 by the user interface controller 208. Next, at step S53, the apparatus waits for the user 211 to enter authentication information using the control panel 105 on the basis of this display. If the authentication information is entered, then control proceeds to step S54 and the entered authentication information is delivered to this authentication mechanism. As a result, at step S55, this authentication mechanism searches the database of this authentication mechanism based upon the entered authentication information to determine whether the entered authentication information of user 211 has been registered. When the authentication information has been registered, control proceeds to step S56, where it is decided that user 211 has been authenticated. When the authentication information has not been registered, on the other hand, control proceeds to step S57, where it is judged that the user could not be authenticated.

Figure 16:
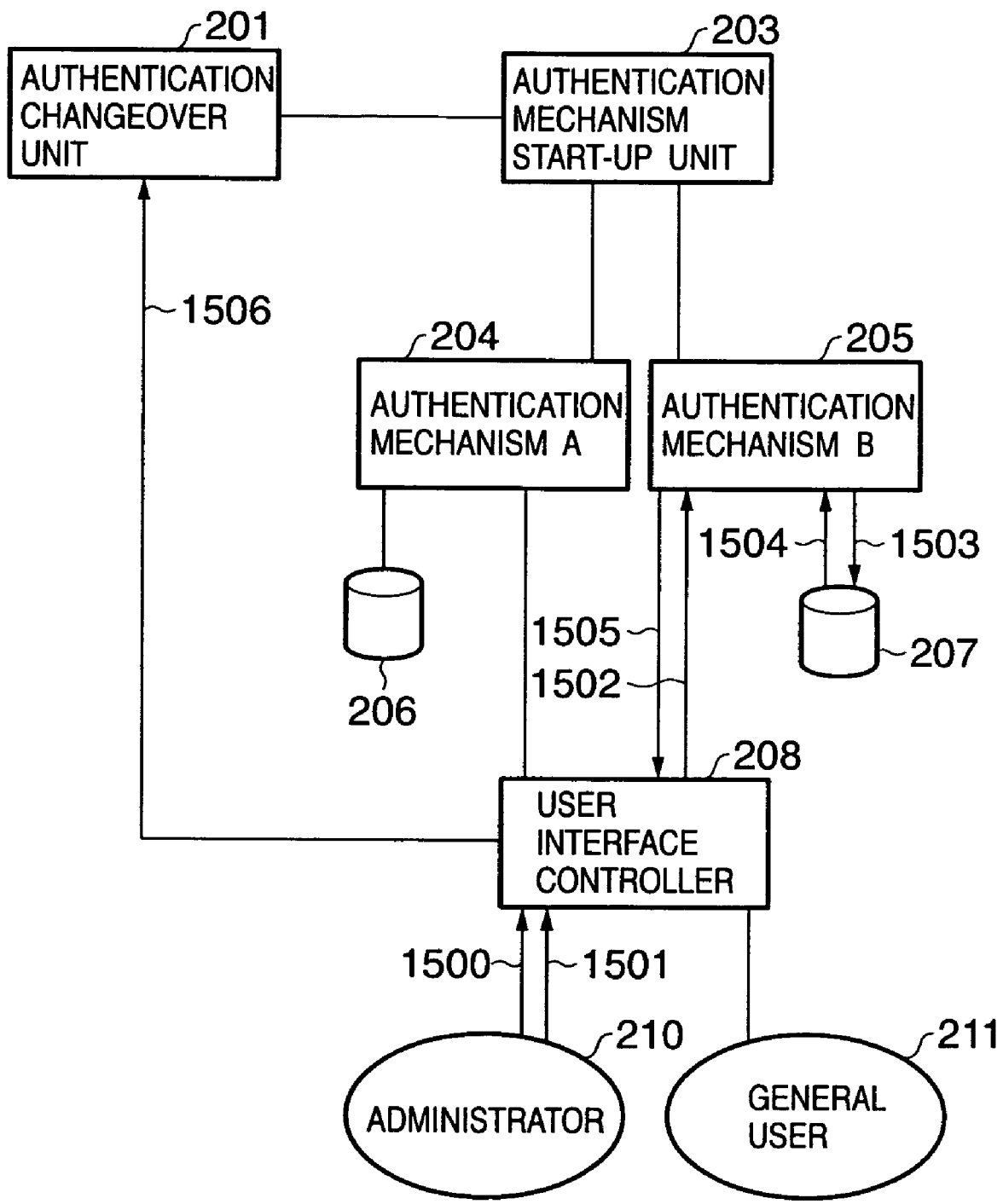
FIG. 16 is a functional block diagram for describing a case where an administrator changes over an authentication mechanism using a user interface in the data processing apparatus according to the third embodiment.

FIG. 16 is a diagram illustrating exchanges between the software components in a case where a user (the administrator) changes over the authentication mechanism after the authentication mechanism has been started up in the third embodiment. A user having this privilege shall be referred to as the administrator.

Exchanges after the administrator user 210 has been authenticated as the administrator through the foregoing procedure will be described. After the administrator user 210 has been authenticated as the administrator, the administrator user 210 causes an authentication-mechanism selection screen to be displayed on the display unit 103 through a suitable method by means of the control panel 105 using the user interface controller 208. The mounting of such a function is obvious if a menu system or the like is used and therefore need not be described. The authentication-mechanism selection screen is thus displayed. A list of authentication mechanisms with which this data processing apparatus is equipped is displayed on the selection screen. On the basis of the list displayed, the administrator 210 selects (1500) a desired authentication mechanism from the control panel 105 and the user interface controller 208 displays a screen that prompts the administrator 210 to enter authentication information such as the user name. If authentication information is entered (1501) from the control panel 105 by the administrator, the user interface controller 208 requests (1502) the selected authentication mechanism to verify the authentication information. Assume here that the authentication mechanism B (205) has been selected. On the basis of the authentication information accepted, the authentication mechanism B (205) searches the database 207 of authentication mechanism B (1503). As a result, the database 207 of authentication mechanism B sends the result (1504) of the search back to the authentication mechanism B (205). If the result indicates success of authentication, then the name of the selected authentication mechanism is sent to the authentication changeover unit 201 (1505, 1506) and is stored as the effective authentication mechanism. The information thus stored is referred to by the authentication mechanism start-up unit 203 the next time the data processing apparatus is started up.

FIG. 17 is a diagram useful in describing a case where an administrator user changes over the authentication mechanism after the data processing apparatus according to the third embodiment has been changed over. A user having such privilege shall be referred to as the administrator.

This processing is started in response to a command designating changeover of the authentication mechanism. First, if the administrator user 210 enters authentication information at step S61, it is determined in a manner similar to the foregoing whether this user has been registered as the administrator (step S62), this determination being made in dependence upon whether the authentication information has been registered. When the user has not been registered as an administrator, control proceeds to step S69. Since the user is not a registered administrator, here a display to the effect that the authentication mechanism cannot be changed over is displayed and this processing is exited.

If it is found at step S62 that the administrator user 210 is authenticated as the administrator, control proceeds to step S63, where the administrator user 210 displays the authentication-mechanism selection screen by a suitable method using the user interface controller 208. As a result, a list of the authentication mechanisms with which this data processing apparatus is equipped is displayed. Next, control proceeds to step S64. If on the basis of the displayed list the administrator 210 selects a desired authentication mechanism using the control panel 105, control proceeds to step S65, where the selected authentication mechanism is selected. Next, control proceeds to step S66, at which a screen that prompts the administrator user 210 to enter authentication information such as a name is displayed. If the administrator user 210 enters the authentication information by the control panel 105, control proceeds to step S67, where the selected authentication mechanism is requested to verify the authentication information. Accordingly, this authentication mechanism searches the database of the authentication mechanism based upon the accepted authentication information and determines whether the authentication information of this administrator has been registered in this database. If it is determined as a result that the authentication information has been registered, control proceeds to step S68. Here the name of the selected authentication mechanism is sent to the authentication changeover unit 201 and is registered as the effective authentication mechanism. The information thus stored is referred to by the authentication mechanism start-up unit 203 when the data processing apparatus is started up next.

In accordance with the third embodiment, as described above, there is provided an apparatus equipped with a plurality of authentication mechanisms, in which an authentication mechanism that has been registered as being effective can be started up and a user can be authenticated by this authentication mechanism based upon authentication information of a user that has been entered using a control panel. Further, an administrator can select a desired authentication mechanism from among a plurality of authentication mechanisms using a control panel and this authentication mechanism can be used to authenticate a user.

It should be noted that a multifunction copier having functions such as facsimile and printer functions in addition to a copier function can be mentioned as a specific example of the data processing apparatus described above. The copier can be used to perform copying or facsimile transmission only in a case where a general user has been authenticated using the authentication mechanism that has been selected at the time (the mechanism essentially being constituted by software although specific hardware such as a card reader is used depending upon the particular case). A user that is incapable of being authenticated cannot use the copier, as a matter of course.

Further, a user who has been registered as an administrator can change over the authentication mechanism as necessary. If the authentication mechanism is thus changed over, it becomes possible to perform user authentication using, e.g., a web page, and the information that each user enters for the purpose of authentication also will change. This means that users capable of using this copier will change even among general users. Further, owing to such a changeover in authentication mechanism, a user who has been granted the right to change the basic settings of this multifunction copier can be distinguished from other users.

Further, according to the present invention, it is so arranged that authentication is performed using the name of a user, and what is to be recognized is the user per se. However, in a case where the computer of a user and a copier with a printer function have been connected on a network, authentication may just as well be performed by using the ID of the computer machine instead of user name (in which the object of authentication would be the computer). Further, it may be so arranged that authentication is performed based upon the type of document to be printed or transmitted by facsimile. In such case the object of authentication would be the document (the print job or the job to be transmitted).

OTHER EMBODIMENTS

The present invention may be applied to a system constituted by a plurality of devices (e.g., a host computer, interface, reader, printer, etc.) or to an apparatus comprising a single device (e.g., a copier or facsimile machine, etc.). For example, the present invention is also applicable to a single-function apparatus having only one function from among a plurality of functions such as a scanning function, printing function, copying function, facsimile function, printer function and network function. In addition, the present invention is also applicable to a multifunction apparatus having at least two of the above-mentioned plurality of functions, such as a digital multifunction machine having two functions, e.g., the copying function and the printer function, and a digital multifunction machine having three or more functions, e.g., the copying, facsimile and printer functions.

Furthermore, it goes without saying that the object of the invention is attained also by supplying a storage medium storing the program codes of the software for implementing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the embodiments and the storage medium storing the program codes constitutes the invention.

Examples of storage media that can be used for supplying the program code are a floppy disk, hard disk, optical disk, magneto-optical disk, CD-ROM, CD-R, magnetic tape, non-volatile type memory card or ROM, etc. Furthermore, besides the case where the aforesaid functions according to the embodiments are implemented by executing the program codes read by a computer, it goes without saying that the present invention covers a case where an OS (operating system) or the like running on the computer performs a part of or the entire process in accordance with the designation of program codes and implements the functions according to the embodiment.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiments.

Thus, in accordance with these embodiments, as described above, there is provided an apparatus having a plurality of authentication mechanisms, in which authentication of a user who attempts to change over the authentication mechanism can be performed at the time of changeover of the authentication mechanism. Further, authentication of a user who has specified changeover is performed even in a case where authentication mechanisms arranged in parallel are changed over. This makes it possible to prevent circumstances in which an apparatus can no longer be utilized because a database of authentication information changes after an authentication mechanism is changed over.

EFFECTS OF THE INVENTION

In accordance with the present invention, as described above, problems of convenience and security can be solved.

Further, in accordance with the present invention, authentication can be verified by a new authentication mechanism, before an authentication mechanism is changed over, in order to avoid a situation in which an apparatus can no longer be used because a user does not happen to have suitable authentication information after an authentication mechanism is changed over.

As many apparently widely different embodiments of the present invention can be made without departing from the spirit and scope thereof, it is to be understood that the invention is not limited to the specific embodiments thereof except as defined in the claims.

The invention claimed is:

1. An authentication apparatus having a plurality of authentication mechanisms, characterized by comprising:
   an input unit adapted to input authentication information of an object of authentication, said authentication information having been already authenticated by a first mechanism that is in use;
   a determination unit adapted to determine whether the authentication information that has been input by said input unit corresponds to an object of authentication that has an authority to change over the first authentication mechanism in use to another authentication mechanism;
   a display control unit adapted to display a list of the plurality of authentication mechanisms if it has been determined by said determination unit that the authentication information that has been input corresponds to the object of authentication that has the authority to make the changeover;
   a registration unit adapted to register, as an effective authentication mechanism, a second authentication mechanism that has been selected from the list displayed by said display control unit;
   a verification unit adapted to verify that authentication of the object of authentication in the second authentication mechanism succeeds; and
   a changeover control unit adapted to control management of the object of authentication so that successful authentication of the object of authentication in the second authentication mechanism is verified before management is changed over from the first authentication mechanism to the second authentication mechanism,
   wherein the first authentication mechanism and the second authentication mechanism are managed by a common staff-up unit,
   wherein changeover of management of the object of authentication, which has been successfully authenticated in the first authentication mechanism, from the first authentication mechanism to the second authentication mechanism is initiated in response to selection of the second authentication mechanism as an effective authentication mechanism,
   wherein the object of authentication continues to be in an authenticated state in the first authentication mechanism, and is not released from management under the first authentication mechanism, until successful authentication in the second authentication mechanism is verified, wherein said input unit reads a card on which authentication information of an object of authentication has been recorded and inputs said authentication information, and wherein the changeover control unit is a central processing unit.

2. The authentication apparatus according to claim 1, wherein said input unit inputs the authentication information by using a web browser.

3. The authentication apparatus according to claim 1, wherein each of said plurality of authentication mechanisms has:
a storage unit that has registered authentication information of an object of authentication; and
an authentication determination unit which, in a case where entered authentication information of a user has been registered in said storages unit, is for authenticating this object of authentication.

4. The authentication apparatus according to claim 1, further having a start-up unit for starting up an authentication mechanism that has been registered as an effective authentication mechanism by said registration unit.

5. An authentication method of changing over a plurality of authentication mechanisms and performing authentication with anyone of said plurality of authentication mechanisms, comprising:
an input step of inputting authentication information of an object of authentication, said authentication information having been already authenticated by a first authentication mechanism that is in use;
a determination step of determining whether the authentication information that has been input at said input step corresponds to an object of authentication that has an authority to change over the first authentication mechanism in use to another authentication mechanism;
a display control step of displaying a list of the plurality of authentication mechanisms if it has been determined at said determination step that the authentication information that has been input corresponds to the object of authentication that has the authority to make the changeover;
a registration step of registering, as an effective authentication mechanism, a second authentication mechanism that has been selected from the list displayed at said display control step;
a verification step of verifying that authentication of the object of authentication in the second authentication mechanism succeeds; and
a changeover control step of controlling management of the object of authentication so that successful authentication of the object of authentication in the second authentication mechanism is verified before management is changed over from the first authentication mechanism to the second authentication mechanism,
wherein the first authentication mechanism and the second authentication mechanism are managed by a common staff-up unit,
wherein changeover of management of the object of authentication, which has been successfully authenticated in the first authentication mechanism, from the first authentication mechanism to the second authentication mechanism is initiated in response to selection of the second authentication mechanism as an effective authentication mechanism,
wherein the object of authentication continues to be in an authenticated state in the first authentication mechanism, and is not released from management under the first authentication mechanism, until successful authentication in the second authentication mechanism is verified,
wherein one or more of the foregoing steps is performed using a processor, and
wherein a card on which authentication information of an object of authentication has been recorded is read and said authentication information is input at said input step.

6. The authentication method according to claim 5, wherein the authentication information input by a web browser at said input step.

7. The authentication method according to any one of claim 5, wherein each of said plurality of authentication mechanisms has a storage unit that registers authentication information of an object of authentication, and said method further has an authentication determination step which, in a case where entered authentication information of an object of authentication has been registered in said storage unit, is a step of authenticating this object of authentication.

8. The authentication method according to claim 5, further having a start-up step of starting up an authentication mechanism that has been registered as an effective authentication mechanism at said registration step.

9. An authentication method comprising:
an input step of inputting authentication information of an object of authentication;
a first authentication step of authenticating whether an object of authentication has access right to a first system using the authentication information of the object of authentication that has been input at said input step, and allowing the object of authentication to access the first system if authentication succeeds;
a second authentication step of authenticating whether the object of authentication has access right to a second system using the authentication information of the object of authentication that has been input at said input step, and allowing the object of authentication to access the second system if authentication succeeds;
a control step of controlling whether the object of authentication will be managed under management of the first system or under management of the second system; and
a verification step of verifying that authentication of the object of authentication in the second system has succeeded at said second authentication step;
wherein the first system an the second system are managed by a common start-up unit,
wherein changeover of management of the object of authentication, which has been successfully authenticated in the first system, from the first system to the second system is initiated in response to an instruction to switch the object of authentication from management under the first system to management under the second system,
wherein if an instruction is recognized, that instructs to switch the object of authentication that is authenticated at the first authentication step from management under the first system to management under the second system, said control step performs control so that successful authentication of the object of authentication in the second system is verified before management is changed over from the first system to the second system,
wherein the object of authentication continues to be in an authenticated state in the first system, and is not released from management in the first system, until successful authentication in the second system is verified, wherein one or more of the above steps is performed using a processor, wherein said input step reads a card on which authentication information of an object of authentication has been recorded and inputs said authentication information.

10. The authentication method according to claim 9, wherein said control step controls said first authentication step in such a manner that the object of authentication is excluded from management at said first authentication step in a case where it is verified at said verification step that the object of authentication has been authenticated at said second authentication step.

11. The authentication method according to claim 9 wherein said first authentication step authenticates user-level access privilege, and said second authentication step manages administrator-level access privilege.

12. An authentication apparatus comprising:

an input unit adapted to input authentication information of an object of authentication;

a first authentication unit adapted to authenticate whether an object of authentication has access right to a first system using the authentication information of the object of authentication that has been input by said input unit, and allowing the object of authentication to access the first system if authentication succeeds;

a second authentication unit adapted to authenticate whether the object of authentication has access right to a second system using the authentication information of the object of authentication that has been input by said input unit, and allowing the object of authentication to access the second system if authentication succeeds;

a control unit adapted to control whether the object of authentication will be managed under management of the first system or under management of the second system; and a verification unit adapted to verify that authentication of the object of authentication in the second system by said second authentication unit has succeeded;

wherein the first system and the second system are managed by a common start-up unit, wherein changeover of management of the object of authentication, which has been successfully authenticated in the first system, from the first system to the second system is initiated in response to an instruction to switch the object of authentication from management under the first system to management under the second system, wherein if an instruction is recognized, that instructs to switch the object of authentication that is authenticated at the first authentication unit step from management under the first system to management under the second system, said control unit performs control so that successful authentication of the object of authentication in the second system is verified before management is changed over from the first system to the second system, and wherein the object of authentication continues to be in authenticated state in the first system, and is not released from management in the first system, until successful authentication in the second system is verified, wherein said input unit reads a card on which authentication information of an object of authentication has been recorded and inputs said authentication information, and wherein the control unit is a central processing unit.

13. The authentication apparatus according to claim 12, wherein said control unit controls said first authentication unit in such a manner that the object of authentication is excluded from management by said first authentication unit in a case where it is verified by said verification unit that the object of authentication has been authenticated by said second authentication unit.

14. The authentication apparatus according to claim 12 wherein said first authentication unit authenticates user-level access privilege, and said second authentication unit manages administrator-level access privilege.

15. An authentication program stored in a computer-readable storage medium comprising:

code for implementing an input step of inputting authentication information of an object of authentication;

code for implementing a first authentication step of authenticating whether an object of authentication has access right to a first system using the authentication information of the object of authentication that has been input at said input step, and allowing the object of authentication to access the first system if authentication succeeds;

code for implementing a second authentication step of authenticating whether the object of authentication has access right to a second system using the authentication information of the object of authentication that has been input at said input step, and allowing the object of authentication to access the second system if authentication succeeds;

code for implementing a control step of controlling whether the object of authentication will be managed under management of the first system or under management of the second system; and code for implementing a verification step of verifying that authentication of the object of authentication in the second system has succeeded at said second authentication step;

wherein the first system and the second system are managed by a common start-up unit, wherein changeover of management of the object of authentication, which has been successful authenticated in the first system, from the first system to the second system is initiated in response to an instruction to switch the object of authentication from management under the first system to management under the second system, wherein if an instruction is recognized, that switches the object of authentication that is authenticated at the first authentication step from management under the first system to management under the second system, said control step performs control so that successful authentication of the object of authentication in the second system is verified before management is changed over from the first system to the second system, and wherein the object of authentication continues to be in an authenticated state in the first system, and is not released from management in the first system, until successful authentication in the second system is verified, wherein said input step reads a card on which authentication information of an object of authentication has been recorded and inputs said authentication information.

* * * * *